United States Patent [19]

Markley et al.

[11] 3,997,879
[45] Dec. 14, 1976

[54] FAULT PROCESSOR FOR PROGRAMMABLE CONTROLLER WITH REMOTE I/O INTERFACE RACKS

[75] Inventors: Theodore J. Markley, Mentor; Ernst H. Dummermuth, Chesterland; William W. Searcy, Richmond Heights; Odo J. Struger, Chagrin Falls, all of Ohio

[73] Assignee: Allen-Bradley Company, Milwaukee, Wis.

[22] Filed: Dec. 24, 1975

[21] Appl. No.: 644,074

[52] U.S. Cl. .......................... 340/172.5; 235/151.1
[51] Int. Cl.[2] .................. G06F 9/06; G06F 11/00; G06F 15/46
[58] Field of Search ............ 340/172.5, 146.1 A X; 235/151.1, 151.11

[56] References Cited
UNITED STATES PATENTS

| 3,036,290 | 5/1962 | Zarouni | 340/146.1 A X |
| 3,810,104 | 5/1974 | Markley | 340/172.5 |

Primary Examiner—Melvin B. Chapnick
Attorney, Agent, or Firm—Quarles & Brady

[57] ABSTRACT

A programmable controller includes four remotely located input/output interface racks which are connected by cables to an I/O scanner circuit which is centrally located with the controller processor and memory. Input and output data is serially transmitted between the I/O scanner circuit and the interface racks, and fault processors are located in both the I/O scanner circuit and the interface racks to monitor the operation. The fault processors include fault tolerant detector circuits which ignore erroneous transmissions caused by industrial noise, but which initiate a shutdown process when malfunctions occur. The shutdown process is controlled by a programmable disabling circuit which is responsive to program instructions stored in the controller memory to allow independent, quasi-independent, or dependent operation of the machines connected to each of the four interface racks.

13 Claims, 9 Drawing Figures

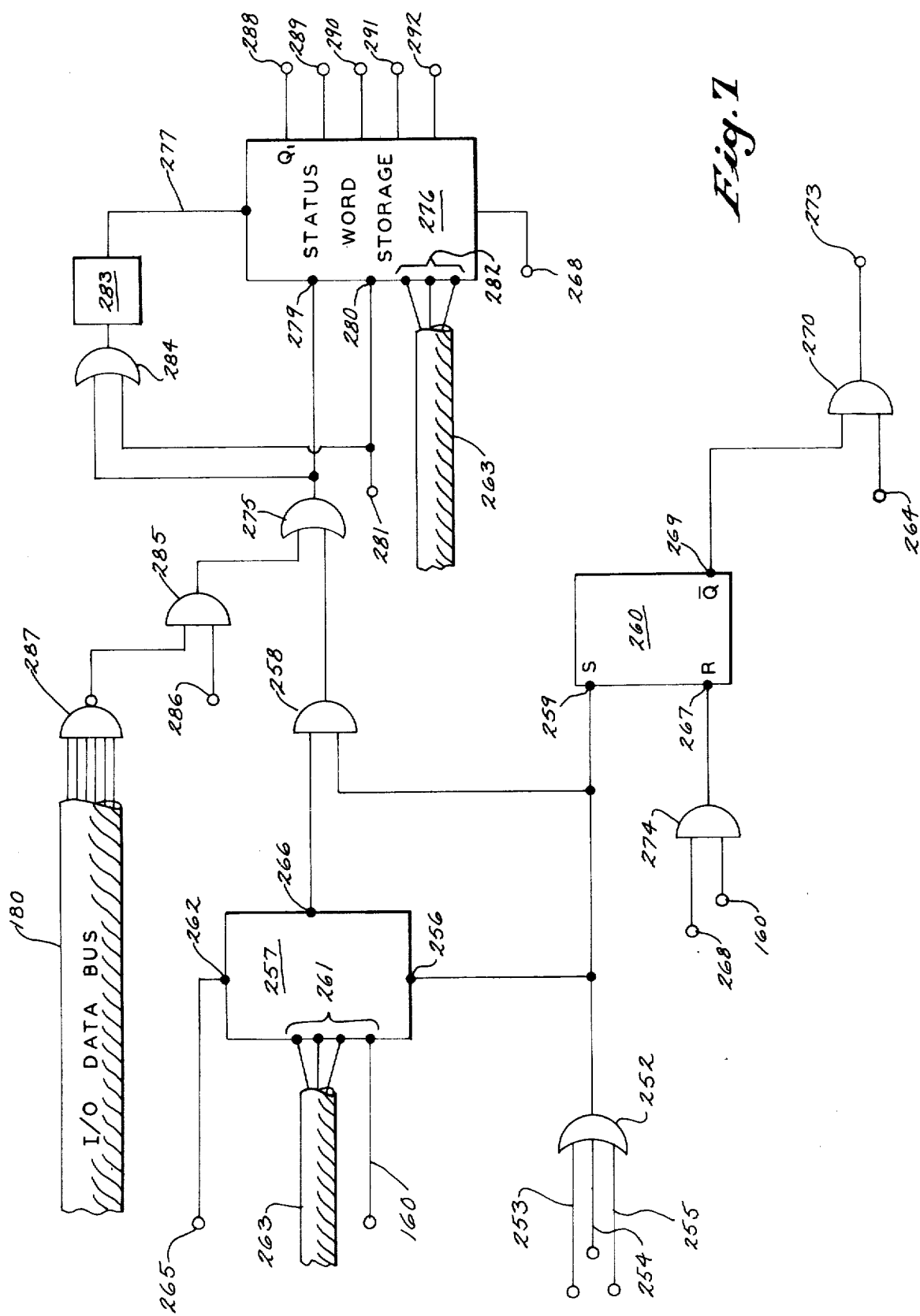

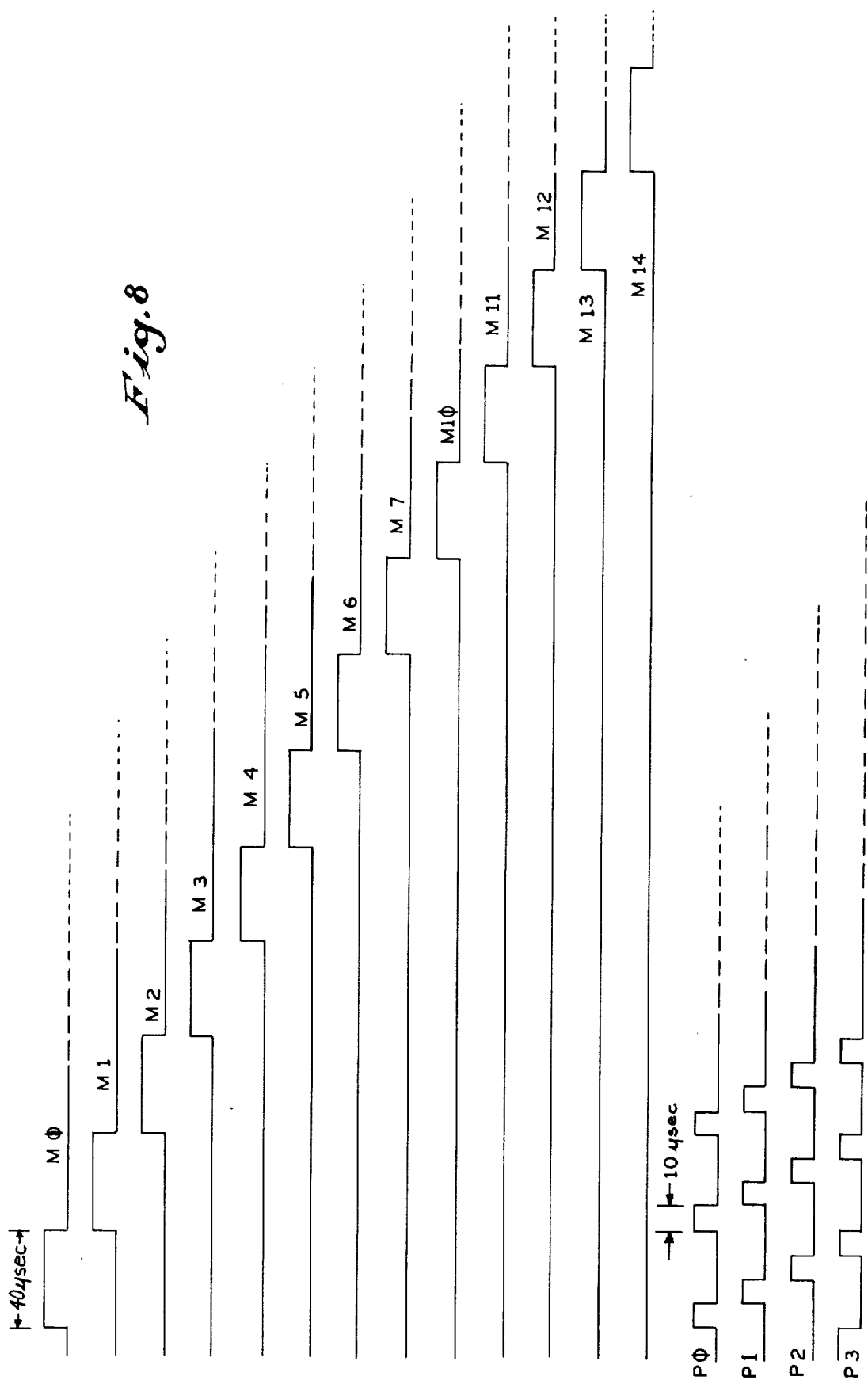

FAULT PROCESSOR FOR PROGRAMMABLE CONTROLLER WITH REMOTE I/O INTERFACE RACKS

BACKGROUND OF THE INVENTION

The field of the invention is digital controllers, and more particularly, programmable controllers used to operate industrial machines and processes.

Programmable controllers such as that disclosed in U.S. Pat. No. 3,810,118 issued May 7, 1974, and entitled "Programmable Matrix Controller" are rapidly replacing relay panels and hardwired logic systems for many control applications. Sensing devices such as limit switches are mounted on the controlled system and connect to the programmable controller to provide information concerning the status of the controlled system. The programmable controller also connects to operating devices, such as solenoids and motors on the controlled system, and depending on the status of the system as indicated by the sensing devices, it selectively energizes the operating devices to provide the desired system operation. The desired system operation is determined by a control program which is comprised of a set of instructions which are sequentially read out of a controller memory.

As disclosed in U.S. Pat. No. 3,942,158, entitled "Programmable Logic Controller", the speed at which the control program is executed can be substantially increased if the input/output operations are performed independently of the controller processor by an I/O scanner circuit. The I/O scanner circuit operates to periodically couple status data between the controlled system and input/output image tables stored in the controller memory. The controller processor operates at high speed to execute a control program which is also stored in the controller memory and to thereby continuously update the the output image table. The asynchronous operation of the I/O scanner circuit allows state of the art processing speeds for execution of the control program while maintaining relatively low data rates in the circuitry which interfaces the programmable controller to the controlled system.

In the vast majority of present applications the programmable controller is mounted in a cabinet situated immediately alongside the machine being controlled. A pair of wires from each sensing device and each operating device on the controlled machine are connected to interface circuitry which is located on an I/O interface rack mounted inside the cabinet. Such an I/O interface rack is described in the above cited copending patent application as well as in copending U.S. patent application Ser. No. 562,247, filed Mar. 26, 1975 and entitled "Disconnect Arm for Electrical Equipment". The number of I/O interface racks for any installation will depend upon the complexity of the machine being controlled and each I/O interface rack is connected to the I/O scanner circuit by means of a short cable. Data is coupled between the I/O interface racks and the I/O scanner circuit over a very short distance and within the confines of a cabinet.

Since their introduction in 1969 programmable controllers have been limited by economic considerations to relatively complex control applications. It has long been recognized that one means of overcoming this economic limitation is to use a single programmable controller to operate more than one machine, and to thereby more fully utilize the capabilities of the controller processor and the full capacity of the controller memory. The difficulty, however, is that the machines to be controlled are often spread throughout the factory and the programmable controller must be located remotely from them. Such an arrangement requires the transmission of numerous digital logic signals over long distances through a noisy industrial environment. Also, it is often desirable to operate controlled machines independently of one another so that if one should be shut down due to a malfunction, for example, it does not necessarily affect the remaining controlled machines.

SUMMARY OF THE INVENTION

The present invention relates to a programmable controller having a remotely located I/O interface rack, and more particularly, means for improving the noise immunity of such a controller and for providing independent operation of a plurality of machines connected to separate I/O interface racks which are controlled by a single controller.

The programmable controller includes an I/O scanner which is operable to periodically couple data between a set of remote I/O interface racks and input/output image tables stored in the controller memory. Communications between the I/O scanner and each interface rack is accomplished using universal asynchronous receiver/transmitters which couple the digital input and output data serially over a pair of lines. Transmission errors such as parity errors, framing errors and overrun errors are sensed at both the interface rack and the I/O scanner and coupled to a fault tolerant detector circuit. Rather than recognizing each such sensed error, the fault tolerant detector circuit stores the fact that an error occurred and causes the involved data to be ignored by the programmable controller. If during the next transmission between the I/O scanner circuit and the same remote I/O interface rack another transmission error is sensed, however, the fault tolerant detector circuit initiates a suitable response such as decontrolling, or deenergizing, all operating devices on the machine being controlled by the involved I/O interface rack. Thus, when a single transmission error is sensed it is presumed that the error was caused by environmental conditions such as electrical noise; however, when subsequent errors occur in succession a malfunction is indicated.

Another aspect of the invention resides in the manner in which the controller responds to a malfunction such as a transmission error. When the malfunction is detected at an I/O interface rack, it is a simple matter to at least deenergize all operating devices connected to that I/O interface rack. When the malfunction is detected at the centrally located I/O scanner circuit, however, a programmable disabling circuit is enabled and only selected operating devices on one or more controlled machines are automatically deenergized by the continued operation of the programmable controller. By properly programming the disabling circuit, a malfunction which involves one I/O interface rack may result in the disablement of only those operating devices associated with that interface rack, or if it is desired, selected operating devices associated with other interface racks may also be disabled. Indeed, the entire system may be shut down in response to certain malfunctions. Independent, quasi-independent or dependent operation of a plurality of machines connected to a single programmable controller may thus be achieved.

A general object of the invention is to provide a programmable controller having remotely located I/O interface racks. Because the I/O data is coupled serially between the centrally located I/O scanner and each remote I/O interface rack, a minimal number of connecting wires are required. Each remote I/O interface rack may be located up to 5,000 feet from the I/O scanner circuit and massive and expensive cables are not required.

Another object of the invention is to rapidly scan the remotely located I/O interface racks and to quickly respond to malfunctions which may occur in any one of them. Output data is transmitted serially to each remote I/O interface rack over a first pair of wires and input data is transmitted serially to the I/O scanner circuit from each interface rack over a second pair of wires. Although these transmissions are initiated sequentially, there is considerable overlap of the transmission periods with a resulting shortening of the total time needed to scan all the remote I/O interface racks. After all of the input circuits and output drive circuits on each remote I/O interface rack have been scanned, the remote I/O interface rack transmits a status word to the I/O scanner circuit to indicate whether or not a malfunction has occurred during that scan. If such a malfunction has occurred, the controller takes immediate remedial action and the location of the malfunction is identified for maintenance personnel.

Another object of the invention is to provide programmable means for responding to a detected malfunction in one of the remote I/O interface racks. Selected pairs of special instructions associated with each remote I/O interface rack are placed in the control program stored in the controller memory. When a malfunction is indicated in an interface rack, the operating devices addressed by program instructions which are located in the control program between the pair of special instructions associated with that interface rack are automatically deenergized by the controller.

Another object of the invention is to provide a programmable controller which is tolerant to electrical noises commonly found in industrial environments. The fault tolerant detector circuit of the present invention assumes that transmission errors will occasionally result even when no malfunction has occurred. Rather than initiating a shutdown procedure, therefore, the data involved is merely ignored and the event is stored. It is presumed that ambient noise will not cause two successive transmission errors to occur, and therefore, the fault tolerant detector circuit is responsive to the second of such transmission errors to initiate the shutdown process.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 7 is a schematic diagram of the fault processor which forms part of the rack adapter circuit of FIG. 5, and FIG. 8 is a timing diagram for the programmable controller of FIG. 1.

DESCRIPTION OF THE PREFERRED EMBODIMENT

Figure 1:
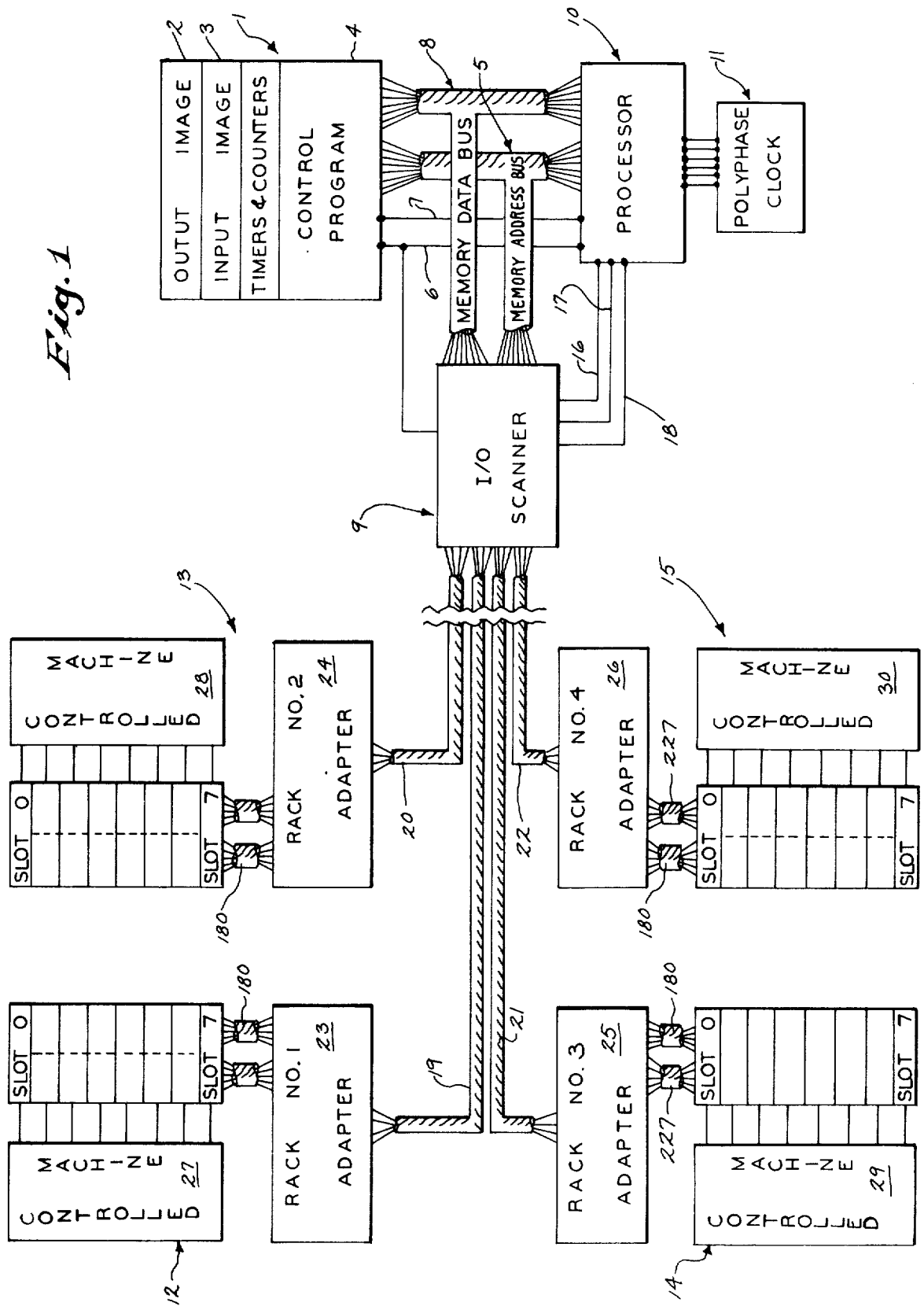
FIG. 1 is a block diagram of a programmable controller which incorporates the present invention.

Referring to FIG. 1, the programmable controller of the present invention includes a random access read/write memory 1 which has an 18-bit word length and which includes from 4096 to 8192 separately addressable lines depending upon the size of the control program which it is to store. Two bits in each word stored in the memory 1 are used for parity checking and thus, 16 data bits are stored on each line of the memory 1. An output image table 2 is stored on the first 64 lines of the memory 1 and is addressable with the octal addresses 000–077, an input image table 3 is stored on the next 64 lines of the memory 1 and is addressable with the octal addresses 100–177, and preset and accumulated values of counters and timers are stored on the next 128 lines of the memory 1 and are addressable with the octal addresses 200–377. The remaining lines of the memory 1 contain a control program 4 in which program instructions are addressable with octal addresses of 400 or greater.

Selected data is read from the memory 1 by applying the binary equivalent of the (octal) address of the line containing the data to a memory address bus 5 and applying a logic low voltage to a read/write line 6. The memory 1 is cycled by applying a logic high pulse to a memory cycle line 7 and the addressed word is read out on a memory data bus 8. A word is loaded, or written into a selected line of the memory 1 by applying the octal address of that line to the memory address bus 5, applying a logic high voltage to the read/write line 6 and applying a logic high voltage pulse to the memory cycle line 7. The 16-bit data word appearing on the memory data bus 8 during the one-microsecond cycle time of the memory 1 is written into the selected line of the memory 1.

The control program 4 is executed by a processor 10 which connects to the memory buses 5 and 8 and to the control lines 6 and 7. In response to 1-megahertz clock pulses generated by a polyphase clock 11, the processor 10 continuously and sequentially reads out the instructions of the control program 4 from the memory 1, and in response to an operation code contained within each program instruction, it performs the operations necessary to carry out the control functions. Such operations include, for example, examining a status bit in the input image table 3 or setting a status bit in the output image table 2 to a desired state. Each status bit in the output image table 2 corresponds with an operating device such as a motor starter or solenoid on a system being controlled, and each status bit in the input image table 3 corresponds with a sensing device such as a limit switch or a photoelectric cell on a controlled system. As will be described hereinafter, an I/O scanner circuit 9 periodically updates each status bit in the input image table 3 with the status of its corresponding sensing device on the controlled system and updates the status of the operating devices on the controlled system with the status of its corresponding bit in the output image table 2. For a more detailed description of the structure and operation of the processor 10 and polyphase clock 11, reference is made to the above cited U.S. Pat. No. 3,942,158, entitled "Programmable Logic Controller".

The I/O scanner circuit 9 serves to couple data between the image tables 2 and 3 and four remotely located interface racks 12-15. The I/O scanner circuit 9 connects to the memory data bus 8, the memory address bus 5, and the read/write line 6. It also connects to the processor 10 through an interrupt request line 16, a grant line 17 and a disable line 18. As will be described in more detail hereinafter, the I/O scanner 9 periodically steals a memory cycle from the processor 10 during which it either writes a 16-bit data word into the input image table 3 or reads a 16-bit data word from the output image table 2. The I/O scanner 9 connects to each interface rack 12-15 through a four-conductor shielded cable 19-22 which may be up to 5,000 feet in length.

Each of the interface racks 12-15 includes a rack adapter 23-26 which connects to a respective cable 19-22 and which is mounted in a cabinet that is positioned alongside its associated controlled machine 27-30. Each interface rack 12-15 includes a set of output drive circuits (not shown in the drawings) which connect to operating devices on its associated controlled machine 27-30 and a set of input circuits (not shown in the drawings) which connect to sensing devices on its associated controlled machine 27-30. The drive circuits and input circuits are mounted on printed circuit boards with up to sixteen input circuits or output drive circuits mounted on each board. Each interface rack 12-15 includes up to eight such printed circuit boards which are identified herein by the slot numbers 0-7 into which they are physically inserted. Each interface rack 12-15 can thus monitor and control up to 128 devices on its associated controlled machine 27-30.

As will be described in more detail hereinafter, the I/O scanner 9 operates to continuously and repeatedly scan each slot 0-7 in each of the interface racks 12-15 by coupling sixteen bits of output data from the output image table 2 to each slot or coupling 16 bits of the input data from the slot to the input image table 3. Each complete I/O scan is performed in 10.08 milliseconds to provide a virtually instantaneous reaction to any changing conditions on the controlled machines 27-30. Each I/O scan is executed in the following sequence.

ADDRESS SLOT 0

Step 1 — read 16-bit data word from output image table, output first 8-bit byte to Rack No. 1 and store second byte in I/O scanner;

Step 2 — read second 16-bit data word from output image table, output first 8-bit byte to Rack No. 2 and store second byte in I/O scanner;

Step 3 — read third 16-bit data word from output image table, output first 8-bit byte to Rack No. 3 and store second byte in I/O scanner;

Step 4 — read fourth 16-bit data word from output image table, output first 8-bit byte to Rack No. 4 and store second byte in I/O scanner;

Step 5 — receive first 8-bit byte of input data from Rack No. 1 and output stored second 8-bit byte of output data to Rack No. 1;

Step 6 — receive first 8-bit byte of input data from Rack No. 2 and output stored second 8-bit byte of output data to Rack No. 2;

Step 7 — receive first 8-bit byte of input data from Rack No. 3 and output stored second 8-bit byte of output data to Rack No. 3;

Step 8 — receive first 8-bit byte of input data from Rack No. 4 and output stored second 8-bit byte of output data to Rack No. 4;

Step 9 — receive second 8-bit byte of input data from Rack No. 1 and write complete 16-bit data word from Rack No. 1 into input image table;

Step 10 — receive second 8-bit byte of input data from Rack No. 2 and write complete 16-bit data word from Rack No. 2 into input image table;

Step 11 — receive second 8-bit byte of input data from Rack No. 3 and write complete 16-bit data word from Rack No. 3 into input image table;

Step 12 — receive second 8-bit byte of input data from Rack No. 4 and write complete 16-bit data word from Rack No. 4 into input image table.

Address Slot 1
Repeat Steps 1-12.
Address Slot 2
Repeat Steps 1-12.
Address Slot 3
Repeat Steps 1-12.
Address Slot 4
Repeat Steps 1-12.
Address Slot 5
Repeat Steps 1-12.
Address Slot 6
Repeat Steps 1-12.
Address Slot 7
Repeat Steps 1-12.

INTERFACE RACK STATUS

1. Receive and process 8-bit status word from Rack No. 1;
2. Receive and process 8-bit status word from Rack No. 2;
3. Receive and process 8-bit status word from Rack No. 3;
4. Receive and process 8-bit status word from Rack No. 4.

Figure 2:
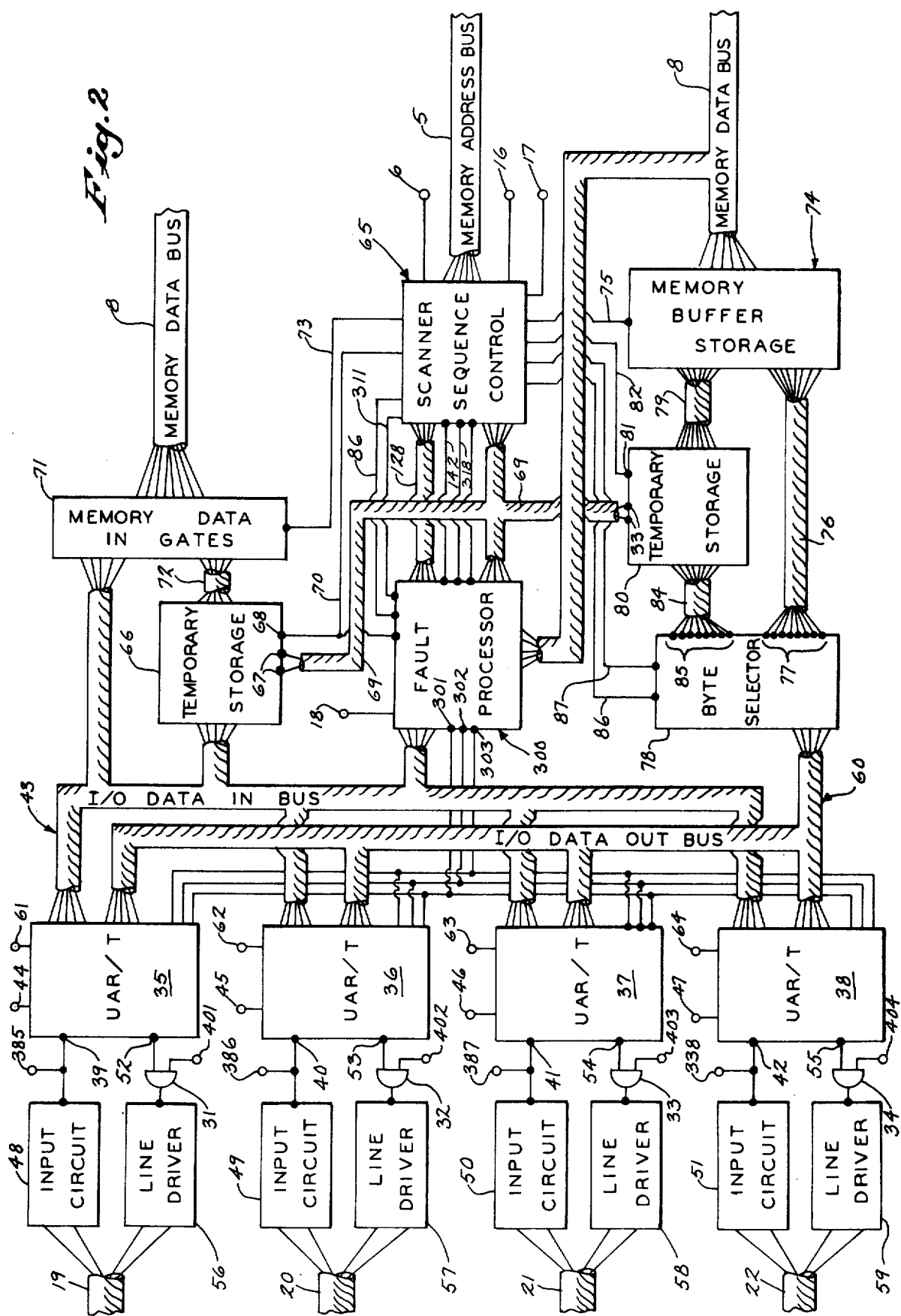
FIG. 2 is a block diagram of the remote I/O scanner circuit which forms part of the programmable controller of FIG. 1.

Referring to FIGS. 1 and 2, the I/O scanner 9 includes a set of four universal asynchronous receiver/transmitters (UAR/T) 35-38, each of which is associated with one of the interface racks 12-15. Each of the UAR/T's 35-38 is a commercially available circuit such as the AY-5-1013 manufactured by the Microelectronics Division of General Instrument Corporation. Each UAR/T 35-38 includes a serial data input terminal 39-42 which receives a start bit, 8 data bits, a parity bit and a stop bit. The 8 received data bits are momentarily held in the respective UAR/T's 35-38 until they are read out in parallel onto an eight-conductor I/O data in bus 43 when a logic high voltage is applied to their respective data in strobe terminals 44-47. Each serial data input terminal 39-42 is coupled to a respective cable 19-22 through an input circuit 48-51 which provides optical isolation and filtering.

Each UAR/T 35–38 also includes a respective serial data output terminal 52–55 which connects through respective AND gates 31–34 and line drivers 56–59 to the cables 19–22. The line drivers 56–59 amplify the serial output data from the UAR/T's 35–38 for transmission over the cables 19–22 to the remotely located interface racks 12–15. The serial output data is comprised of a start bit, 8 data bits, a parity bit and a stop bit. Each UAR/T receives the 8 data bits in parallel from an eight-conductor I/O data out bus when a logic high voltage is applied to its respective data out strobe terminal 61–64. The UAR/T's 35–38 are operated in sequence by a scanner sequence control circuit 65 which connects to their data in and data out strobe terminals 44–47 and 61–64. As will become apparent from the description which follows they are operated to execute the above described I/O scan.

The first byte of input data received by one of the UAR/T's 35–38 is coupled through the I/O data in bus 43 to a temporary storage 66. The temporary storage 66 is a 32-bit random access memory which stores each eight-bit byte of input data on a selected one of four separately addressable lines. The line on which a byte of input data is stored is determined by a two-bit binary coded rack number address applied to a pair of address terminals 67. The data is clocked into the temporary storage 66 by applying a logic high voltage to a clock terminal 68. The rack number address is generated by the scanner sequence control circuit 65 through a two-conductor rack number bus 69 and the clock signal is also generated by the scanner sequence control 65 through a line 70.

When the second 8-bit byte of input data is received by a UAR/T 35–38, it is generated on the I/O data in bus 43 and is applied to a set of memory data in gates 71. The corresponding first byte of input data which had been previously stored in the temporary storage 66 is simultaneously applied to the memory data in gates 71 through an eight-conductor cable 72. The memory data in gates 71 are a set of 16 AND gates each having one input terminal connected to receive one bit of input data and a second input terminal commonly connected to an enable line 73 which connects to the scanner sequence control 65. An output terminal on each AND gate connects to one of the 16 conductors in the memory data bus 8 and when a logic high voltage is applied to the enable line 73, a 16-bit data word is thus applied to the memory data bus 8. As will be described in more detail hereinafter, this data word is written into the input image table 3 by the scanner sequence control 65 which interrupts the operation of the controller processor 10 for one microsecond memory cycle, generates the proper memory address on the memory address bus 5 and drives the read/write line 6 to a logic low voltage.

Output data to be transmitted to the remote interface racks 12–15 is received by the I/O scanner 9 as a 16-bit word on the memory data bus 8 during a 1-microsecond interrupt of the controller processor 10. The output data word is captured, or stored, in a sixteen-bit memory buffer storage 74 when the read/write line 6 is driven to a logic high voltage by the scanner sequence control 65. The buffer storage 74 is comprised of 16 D-type flip-flops which have their clock terminals commonly connected through a line 75 to the scanner sequence control 65. The stored 16-bit data word appears at a set of sixteen output terminals on the memory buffer storage 74, eight of which connect through a cable 76 to a first set of inputs 77 on a byte select circuit 78, and the remaining eight of which connect through a cable 79 to a temporary storage 80. The temporary storage 80 is identical to the temporary storage 66 and the 8-bit byte of output data received from the memory buffer storage 74 is stored therein when a logic high voltage is applied to its clock terminal 81 through a line 82 which connects to the scanner sequence control 65. The line on which the 8-bit byte is stored is determined by the 2-bit rack number address applied to its address terminals 83 from the rack number bus 69. When a logic high voltage is applied to the clock terminal 81 of the temporary storage 80, the 8-bit byte of output data stored on its addressed line is coupled through an 8-conductor cable 84 to a second set of inputs 85 on the byte select circuit 78.

The byte select circuit 78 is comprised of two commercially available 4-bit data selectors whih have their select input terminals commonly connected to a byte select line 86 and their clock terminals commonly connected to a line 87. The lines 86 and 87 are controlled by the scanner sequence control circuit 65. When the byte select line 86 is at a logic high voltage and a logic high clock pulse appears on the line 87, the 8-bit byte of output data on the cable 76 is coupled to the I/O data out bus 60 and whence to one of the UAR/T's 35–38. On the other hand, when the byte select line 86 is at a logic low voltage, an 8-bit byte of output data on the cable 84 is coupled to the I/O data out bus 60 and applied to the same UAR/T 35–38. Thus, when a 16-bit data output word is read from the output image table 2 of the programmable controller memory 1, the first 8-bit byte is coupled to the appropriate UAR/T 35–38 and the second 8-bit byte is momentarily retained in the temporary storage 80. At the appropriate time as determined by the scanner sequence control 65, the second 8-bit byte of output data is coupled to the same UAR/T 35–38 for transmission to its associated I/O interface rack 12–15.

Figure 3:
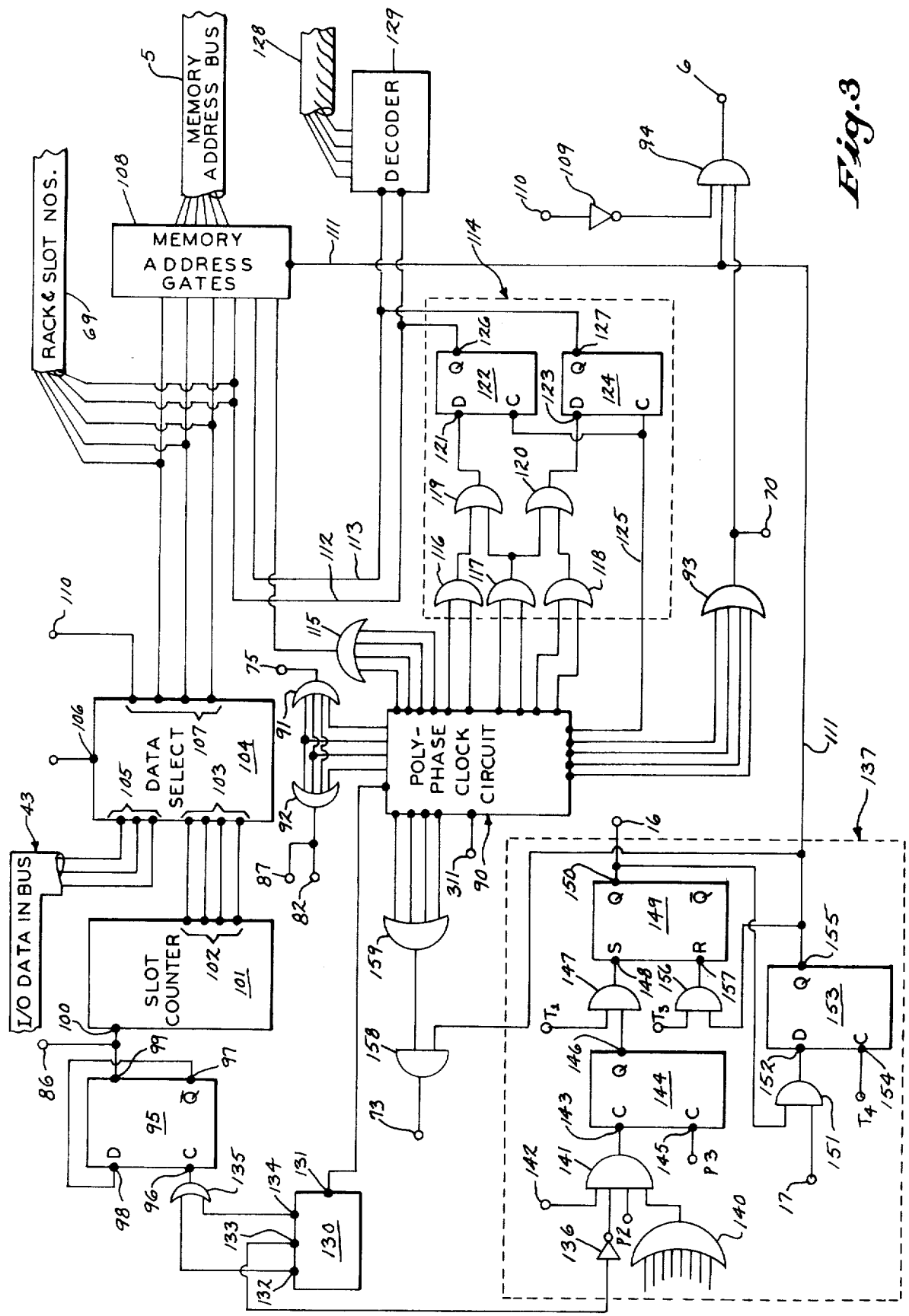
FIG. 3 is a schematic diagram of the scanner sequence control circuit which forms part of the circuit of FIG. 2, FIGS. 4a and 4b are schematic diagrams of the fault processor which forms part of the circuit of FIG. 2.

Referring particularly to FIGS. 2, 3 and 8, the above described sequence of events is controlled by the scanner sequence control circuit 65 which is shown in FIG. 3. The basic timing signals are provided by a polyphase clock circuit 90 of conventional design, which as shown in FIG. 8, generates 13 phase-shifted 40-microsecond clock pulses identified herein as M clocks M0–7 and M10–14. The polyphase clock circuit 90 also generates four phase-shifted 10-microsecond clock pulses during each M clock pulse which are identified as P clocks P0–3. These clocks are also combined using gate circuits to provide a number of complex clock signals. More specifically, the M0, M2, M4 and M6 clocks are connected to inputs on an OR gate 91 and the output of the OR gate 91 connects to the line 75 which operates the memory buffer storage 74. The M2, M4, M6 and M10 clocks are combined at an OR gate 92, the output of which connects through the lines 82 and 87 to the temporary storage 80 and byte select circuit 78, respectively. The M1, M3, M5 and M7 clocks are similarly connected to an OR gate 93 and the output of the OR gate 93 connects through the line 70 to the temporary storage 66. The output of the OR gate 93 also connects to one input terminal of an AND gate 94, the output of which connects to the read/write line 6 on the controller memory 1.

Referring particularly to FIG. 3, a byte counter 95 is formed by a D-type flip-flop which has a Q output 97 connected to its D input terminal 98 and a Q output terminal 99 connected to the byte select line 86. The Q output 99 also connects to an input terminal 100 on a four-bit binary slot counter 101. The slot counter 101 is a commercially available integrated circuit which, in response to logic high pulses applied to its input terminal 100, generates a 4-bit binary coded number at a set of output terminals 102. The slot counter output terminals 102 connect to a first set of four inputs 103 on a data select circuit 104 which has a second set of inputs 105 connected to three leads in the I/O data in bus 43. The data select circuit 104 is a commercially available four-bit data selector which is responsive to the logic state of a data select terminal 106, to generate either the 4-bit binary number applied to the first set of inputs 103 or the 3-bit binary number applied to the second set of inputs 105 at a set of output terminals 107. Three of these outputs connect to a set of memory address gates 108 and the fourth connects through an inverter gate 109 to an input terminal on the AND gate 94. The latter output terminal 107 also connects to a status line 110 which leads to a fault processor to be described hereinafter.

The memory address gates 108 include six AND gates, each having one input terminal commonly connected to an interrupt granted line 111 and each having an output terminal connected to one of the 6 least significant digit leads in the memory address bus 5. A second input on each of the three least significant digit memory address gates 108 connect to the data select output terminals 107, a second input on each of the two next most significant digit memory address gates 108 connect through lines 112 and 113 to the outputs of a rack number counter 114, and a second input on the most significant digit memory address gate 108 connects to the output of an OR gate 115. The OR gate 115 connects to receive the M1, M3, M5 and M7 clocks from the polyphase clock circuit 90.

The rack number counter 114 connects to receive the M2, M3, M4, M6 and M7 clocks from the clock circuit 90. The rack number counter 114 includes a set of three input OR gates 116–118 which each have a pair of inputs connected to receive a respective pair of the M clocks. An output on the OR gate 116 connects to an input on an intermediate OR gate 119, an output on the OR gate 118 connects to an input on a second intermediate OR gate 120, and an output on the OR gate 117 connects to an input on each of the intermediate OR gates 119 and 120. The output of the OR gate 119 connects to a D input 121 on a first D-type flip-flop 122 and the output of OR gate 120 connects to the D input 123 on a second D-type flip-flop 124. A clock terminal on each of the flip-flops 122 and 124 connects through a line 125 to receive clock P0 from the polyphase clock 90. Q output terminals 126 and 127 on the flip-flops 122 and 124 form the outputs of the rack number counter 114 which connect not only to the lines 112 and 113, but also to a four-conductor rack number bus 128 through a two-line-to-four-line decoder circuit 129.

The scanning of a selected slot in each of the four I/O interface racks 12–15 is accomplished during three complete cycles of the M clocks M0 through M14. The number of cycles through the M clocks is stored in a three-bit ring counter 130 which has an input terminal 131 connected to receive the M14 clock. A logic high voltage is generated at a first output terminal 132 during the first cycle of the M clocks, a logic high voltage is generated at a second output terminal 133 during the second cycle, and a logic high voltage is generated at a third output terminal 134 during the third cycle through the M clocks. The first and third outputs 132 and 134 connect to the respective inputs on an OR gate 135 and the output of the OR gate 135 connects to a clock terminal 96 on the byte counter flip-flop 95. The second output 133 also connects through an inverter gate 136 to an interrupt circuit indicated generally by the dashed lines 137.

The interrupt circuit 137 is similar to that described in the above cited copending patent application Ser. No. 473,149 in which the controller processor 10 grants the I/O scanner 9 direct access to the memory 1 for a one microsecond memory cycle. The processor 10 also generates a set of five phase-shifted 200 nanosecond clock pulses identified as T0-4 which divide the one-microsecond memory cycle into five successive time periods. The T1, 3 and 4 clocks are received by the interrupt circuit 137 to synchronize the operation of the I/O scanner 9 during the interrupt.

An interrupt is requested by the circuit 137 at the commencement of each of the M clocks M0-7 during the first and third cycles through the M clocks. The clocks M0-7 are received at an OR gate 140 and applied to one input on an AND gate 141. A second input on the AND gate 141 connects to the inverter gate 136 and a third input connects to an interrupt disable line 142 which leads to the fault processor to be described hereinafter. The output of the AND gate 141 connects to the D input 143 on a D-type flip-flop 144. A clock terminal 145 on the flip-flop 144 connects to receive the P3 clock and its Q output terminal 146 connects to one input on an AND gate 147. A second input on the AND gate 147 receives the T1 clock from the processor 10 and its output connects to an S input 148 on an R—S type flip-flop 149. A Q output terminal 150 on the flip-flop 149 connects to the interrupt request line 16 leading to the processor 10 and it connects to one input on an AND gate 151. A second input on the AND gate 151 connects to the grant line 17 leading from the processor 10 and its output connects to a D input 152 on a D-type flip-flop 53. A clock terminal 154 on the flip-flop 153 connects to receive the T4 clock from the processor 10 and a Q output terminal 155 connects to the interrupt granted line 111. The Q output 155 also connects to one input on an AND gate 156 and a second input on the AND gate 156 connects to receive the T3 clock from the processor 10. The output of the AND gate 156 connects to a reset terminal 157 on the R—S flip-flop 149. The Q output terminal 155 on the flip-flop 153 further connects to an AND gate 158 which operates the memory data in gates 71 through the enable line 73. The AND gate 158 also receives the M1, M3, M5 and M7 clocks through an OR gate 159.

During three complete cycles through the M clocks an addressed slot in each of the remote interface racks 12–15 is fully serviced. Two 8-bit bytes of output data are coupled to each interface rack 12–15 and two 8bit bytes of input data are received from each interface rack 12–15 during the three cycles of the M clock. The rack number counter 114 is generated on the rack number bus 128 to properly operate the temporary storages 66 and 80 and each of the UAR/T's 35–38 is operated by one of the M clocks M1–M10. More specifically the data in strobes 44–47 on the respective UAR/T's 35–38 connect to receive the respective M clocks M1, M3, M5 and M7, and the data out strobe terminals 61–64 connect to receive the respective M clocks M2, M4, M6 and M10.

The interrupt circuit 137 is operated during the first cycle through the M clocks to read 4 16-bit words from the output image table 2 in the controller memory 1 and it is operated during the third cycle through the M clocks to write 4 16-bit data words into the input image table 3. The read/write line 6 is controlled by the scanner sequence control 65 during each 1-microsecond interrupt, and during the M1, M3, M5 and M7 clock pulses it is driven to its logic high, or write, state by the OR gate 93.

The memory address of the proper 16-bit data word in the memory 1 is generated by the memory address gates 108 on the memory address bus 5 during each interrupt. The three least significant digits of this address correspond to the slot number as determined by the slot counter 101, the next two most significant digits correspond to the rack number as determined by the rack number counter 114, and the most significant digit selects the output image table 2 or input image table 3.

The sequence in which the remote I/O scanner elements are operated during each set of three cycles through the M clocks is as follows:

| First Cycle | |
|---|---|
| M0 | Request interrupt and read 16-bit data word out of output image table 2. Hold data word in memory buffer storage 74. |
| M1 | No action. |
| M2 | Couple first 8-bit byte of data through byte selector 78 to UAR/T 35 and commence transmission to interface rack 12. Store second 8-bit byte of data in temporary storage 80. Request interrupt and read second 16-bit data word out of output image table 2. Hold second data word in memory buffer storage 74. |
| M3 | No action. |
| M4 | Couple first byte of second data word through byte selector 78 to UAR/T 36 and commence transmission to interface rack 13. Store second byte of second data word in temporary storage 80. Request interrupt and read third 16-bit data word out of output image table 2. Hold third data word in memory buffer storage 74. |
| M5 | No action. |
| M6 | Couple first byte of third data word through byte selector 78 to UAR/T 37 and commence transmission to interface rack 14. Store second byte of third data word in temporary storage 80. Request interrupt and read fourth 16-bit data word out of output image table 2. Hold fourth data word in memory buffer storage 74. |
| M7 | No action. |
| M10 | Couple first byte of fourth data word through byte selector 78 to UAR/T 38 and commence transmission to interface rack 15. Store second byte of fourth data word in temporary storage 80. |
| M11–M13 | No action. |
| M14 | Advance byte counter 95 through the ring counter 130. |
| Second Cycle | |
| M0 | No action. |
| M1 | Receive first 8-bit byte of input data word from interface rack 12 at UAR/T 35 and store in temporary storage 66. |
| M2 | Couple second byte of first data output word in temporary storage 80 through byte selector 78 to UAR/T 35 and commence transmission to interface rack 12. |
| M3 | Receive first 8-bit byte of second input data word from interface rack 13 at UAR/T 36 and store in temporary storage 66. |
| M4 | Couple second byte of second data output word in temporary storage 80 through byte selector 78 to UAR/T 36 and commence transmission to interface rack 13. |
| M5 | Receive first 8-bit byte of third input data word from interface rack 14 at UAR/T 37 and store in temporary storage 66. |
| M6 | Couple second byte of third data output word in temporary storage 80 through byte selector 78 to UAR/T 37 and commence transmission to interface rack 14. |
| M7 | Receive first 8-bit byte of fourth input data word from interface rack 15 at UAR/T 38 and store in temporary storage 66. |
| M8 | Couple second byte of fourth data output word in temporary storage 80 through byte selector 78 to UAR/T 38 and commence transmission to interface rack 15. |
| M10–M13 | No action. |
| M14 | Increment ring counter 130. |
| Third Cycle | |
| M0 | No action. |
| M1 | Receive second 8-bit byte of input data word from interface rack 12 at UAR/T 35, interrupt processor 10 and write first 16-bit input data word into input image table 3 through memory data in gates 71. |
| M2 | No action. |

| | |
|---|---|
| M3 | Receive second 8-bit byte of second input data word from interface rack 13 at UAR/T 36, interrupt processor 10 and write second 16-bit input data word into input image table 3 through memory data in gates 71. |
| M4 | No action. |
| M5 | Receive second 8-bit byte of third input data word from interface rack 14 at UAR/T 37, interrupt processor 10 and write third 16-bit input data word into input image table 3 through memory data in gates 71. |
| M6 | No action. |
| M7 | Receive second 8-bit byte of fourth input data word from interface rack 15 at UAR/T 38, interrupt processor 10 and write fourth 16-bit input data word into input image table 3 through memory data in gates 71. |
| M10–M13 | No action. |

Figure 5:
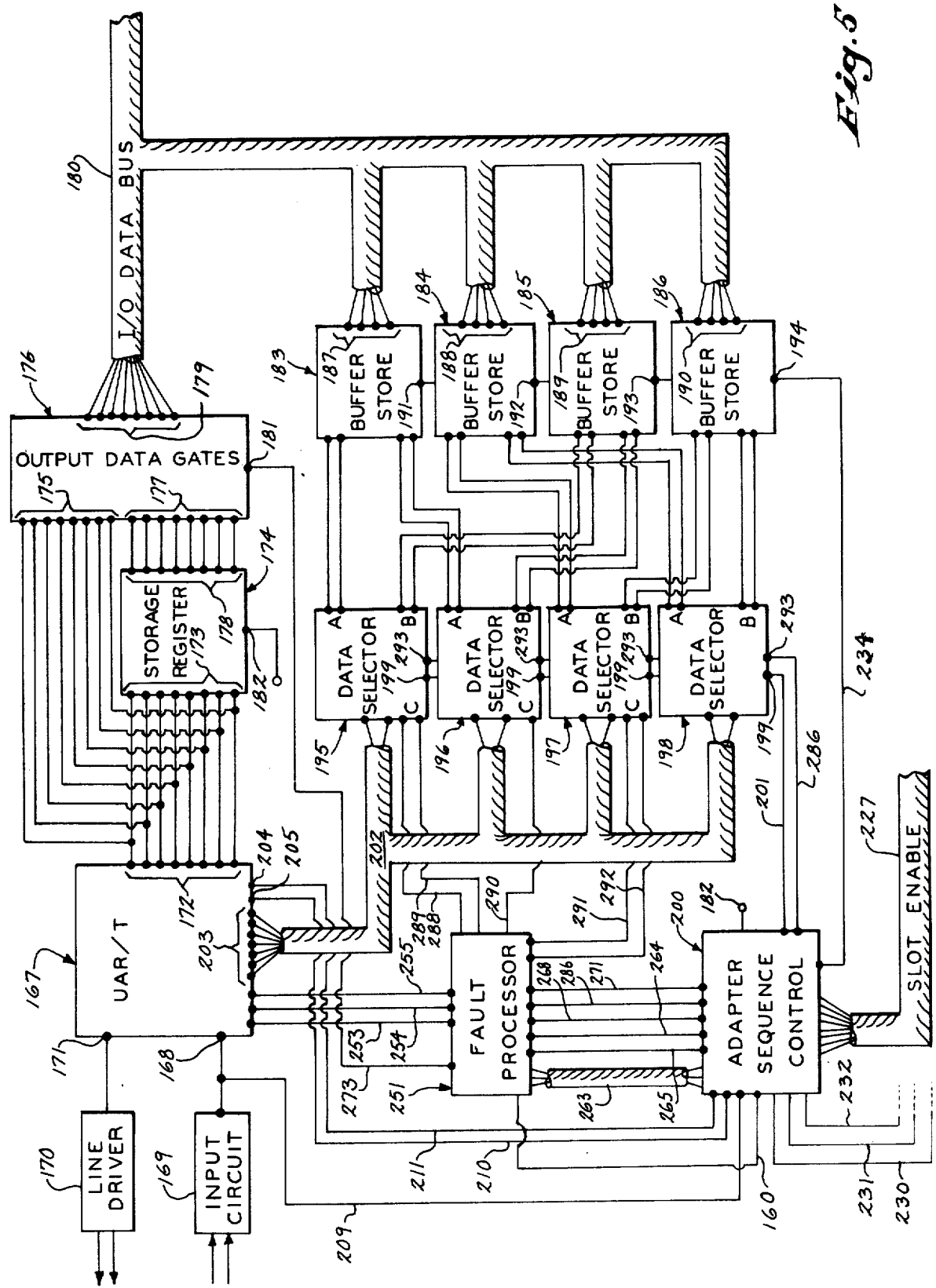
FIG. 5 is a block diagram of a rack adapter which forms part of the programmable controller of FIG. 1.
Figure 6:
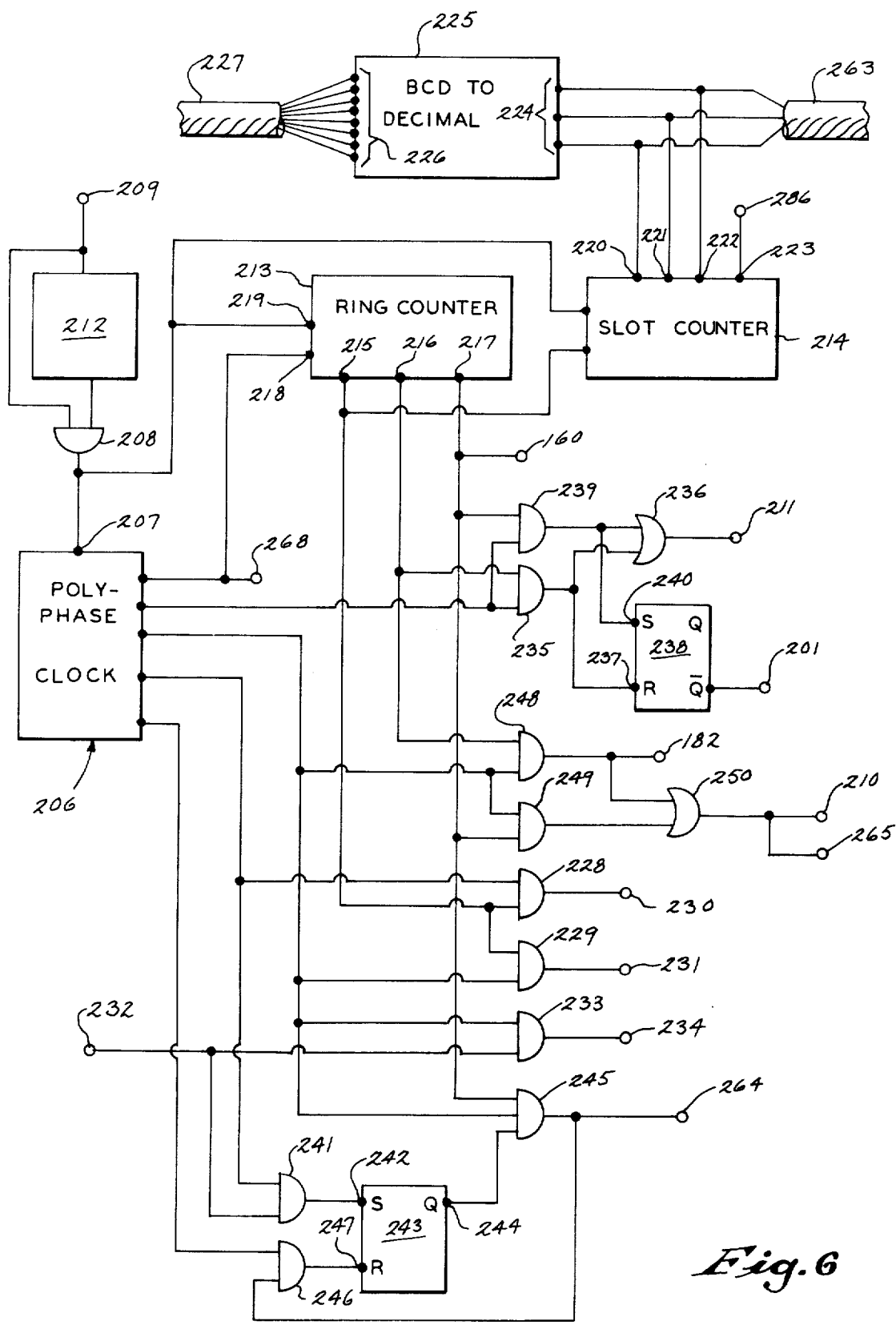
FIG. 6 is a schematic diagram of the adapter sequence control which forms part of the rack adapter circuit of FIG. 5.

Referring particularly to FIGS. 1, 5 and 6, the rack adapters 23–26 on each of the interface racks 12–15 couples to an associated UAR/T 35–38 in the I/O scanner 9 through one of the respective cables 19–22. The rack adapters 23–26 are identical to one another and the following description therefore applied to each.

Each adapter circuit includes a UAR/T 167 which is identical to those contained in the I/O scanner 9 described above. Serial input data is received at a terminal 168 from an input circuit 169 and serial output data is generated to a line driver circuit 170 through an output terminal 171. The line drive circuit 170 and input circuit 169 are identical to those contained in the I/O scanner circuit 9, the line driver 170 being connected to a pair of leads in one of the cables 19–22, and the input circuit 169 being connected to the other pair. A set of eight parallel data output terminals 172 on the UAR/T 167 connect to a corresponding set of eight inputs 173 on an 8-bit storage register 174 and to a first set of eight inputs 175 on 16 output data gates 176. A second set of eight inputs 177 on the output data gates 177 connect to a set of 8 output terminals 178 on the storage register 174 and a set of output terminals 179 connect to the leads in a 16-conductor I/O data bus 180. The output data gates 176 are comprised of 16 AND gates, each having one input connected to a terminal 175 or 177, a second input commonly connected to receive a data request signal through an enable terminal 181, and an output terminal connected to a lead in the I/O data bus 180. The storage register 174 is a commercially available integrated circuit which includes a clock terminal 182 which is operative when a logic high voltage is received to store an 8-bit byte of a data applied to its inputs 173.

The 16 leads in the I/O data bus 180 also connect to a set of 4 4-bit buffer storage registers 183–186. Each storage register 183 is a commercially available integrated circuit which stores 4 bits of data applied to its respective input terminal 187–190 when a logic high voltage is applied to its respective clock terminal 191–194. Output terminals on the four storage registers 183–186 connect to a set of four dual four-line-to-one-line data selectors 195–198. More specifically, a pair of outputs on the first storage register 183 connects to a pair of A inputs on the data selector 195, a second pair of outputs on the storage register 183 connects to a pair of A inputs on the data selector 196, a pair of outputs on the second storage register 184 connects to a pair of A inputs on the data selector 197, and a second pair of outputs on the second storage register 184 connects to a pair of A inputs on the data selector 198. Similarly, a pair of outputs on the third storage register 185 connects to a pair of B inputs on the first data selector 195, a second pair of outputs on the third storage register 185 connects to a pair of B inputs on the data selector 196, a first pair of outputs on the fourth storage register 186 connects to a pair of B inputs on the data selector 197, and a second pair of outputs on the fourth storage register 186 connects to a pair of B inputs on the data selector 198. Each of the data selectors 195–198 includes a first data select terminal 199 which connects to an adapter sequence control 200 through a line 201. When the line 201 is at a logic high voltage, the first 8-bit byte of data stored in the registers 183–186 is coupled to an 8-conductor data bus 202 and when a logic low voltage is applied to the line 201, the data selectors 195–198 couple the second byte of data to the bus 202.

The data bus 202 connects to a set of eight parallel data input terminals 203 on the UAR/T 167. The 16-bit data word which indicates the status of one of the I/O slots on the interface rack is coupled, one 8-bit byte at a time, to the UAR/T 167 for serial transmission to the I/O scanner 9. The eight parallel bits are strobed into the UAR/T 167 through the terminals 203 by the application of a logic high voltage to a data in terminal 205. Parallel data is strobed out through the output terminals 172 of the UAR/T 167 by the application of a logic high voltage to a data out terminal 204. The operation of the UAR/T 167 and the other elements of the adapter circuit are controlled by the adapter sequence control 200 now to be described.

Referring particularly to FIG. 6, the adapter sequence control circuit 200 includes a polyphase clock 206 which is essentially identical to the polyphase clock 90 in the I/O scanner 9 described above. It generates the M clocks and P clocks illustrated in FIG. 8; however, it is not synchronized with the polyphase clock 90 in the I/O scanner 9. The polyphase clock 206 cycles continuously, but is periodically reset through a terminal 207 by a logic high pulse which precedes each sequence of 16 data byte transmissions. This reset pulse is received at the serial input terminal 168 on the UAR/T 167 and is coupled through a line 209 to one input on an AND gate 208 and to the input of a monostable multivibrator 212. The output of the multivibrator 212 connects to a second input on the AND gate 208 and the output of the AND gate 208 connects to the terminal 207 on the polyphase clock 206. The multivibrator 212 generates a logic high voltage at its output terminal a preset time interval after a logic high is applied to its input and, therefore, the AND gate 208 is enabled only when the relatively long reset pulse is received at the UAR/T 167.

The logic high reset pulse generated by the AND gate 208 is also coupled to a 3-bit ring counter 213 and a 4-bit binary slot counter 214. The ring counter 213 is similar to that in the scanner circuit 9 described above in which the number of cycles through the M clocks are sequentially indicated at a set of three output terminals 215-217. A logic high voltage is advanced through the respective output terminals 215-217 by the M14 clock which is applied to an input terminal 218 thereon. The ring counter 213 is reset through a terminal 219 to generate a logic high voltage at its first output terminal 215. The slot counter 214 is a commercially available 4-bit binary counter having a set of four output terminals 220-223. The three least significant digit outputs 220-222 connect to a set of inputs 224 on a BCD to decimal decoder 225 and the most significant digit output terminal 223 connects to a command status bus 286. The BCD to decimal converter 225 is a commercially available integrated circuit which converts the 3-bit BCD number applied to its inputs 224 to a logic high voltage at one of eight output terminals 226. The outputs 226 connect to leads in a slot enable bus 227 which couples to each of the eight slots in the interface rack.

The polyphase clock 206 continuously cycles through the M clocks to thereby cycle the ring counter 213. After three cycles through the M clocks, the slot counter 214 is advanced to service the next slot, and the slot counter 214 thus sequentially enables the 8 slots during 24 cycles through the M clocks. A set of three additional cycles through the M clocks follows, during which a logic high voltage is generated on the command status bus 286 to enable a fault processor 251 to carry out its functions. A short time interval of approximately three cycles through the M clocks then follows, during which no data is transmitted or received. This is followed by another reset pulse which initiates the next scan through the I/O slots.

During the first of each set of three cycles through the M clocks, the nature of the 16 I/O circuits in the enabled slot is determined to establish whether data is to be received from them (sensing devices) or data is to be sent to them (operating devices). To this end, the output 215 on the ring counter 213 connects to an input on each of two AND gates 228 and 229. A second input on the AND gate 228 connects to receive the M13 clock and a second input on the AND gate 229 connects to receive the M11 clock. The output of AND gate 228 connects to an operating device data strobe line 230 which connects to each of the I/O slots, and the output of the AND gate 229 connects to a sensing device data strobe line 231 which also connects to each I/O slot. A data strobe echo line 232 connects to the I/O slots, and a logic high voltage appears thereon when a logic high voltage is applied to the strobe lines 230 or 231. If the enabled I/O slot is comprised of sensing devices, the strobe echo line 232 goes to a logic high voltage when the sensing device data strobe line 231 is driven high, whereas, if the enabled I/O slot is comprised of operating devices, it goes to a logic high voltage when a logic high is generated on the operating device data strobe line 230. In other words, if the line 232 goes high during the M11 clock, the enabled I/O slot is comprised of sensing devices and data is to be received from them and coupled to the I/O scanner 9, whereas, if it goes high during the M13 clock, then the enabled slot is comprised of operating devices and data is to be received from the I/O scanner circuit 9 and generated to them on the I/O data bus 180.

Referring particularly to FIGS. 5 and 6, an AND gate 233 in the adapter sequence control 200 has one input terminal connected to the strobe echo line 232 and a second input connected to receive the M11 clock. If the enabled I/O slot is comprised of sensing devices, its output will be at a logic high voltage during the M11 time period. Its output connects to the clock terminals 191-194 on the buffer stores 183-186 through a line 234 and, therefore, the status of the 16 sensing devices on the I/O data bus 180 is captured and stored in the buffers 183-186. The data selectors 195-198 and the UAR/T 167 are operated during the second and third cycles through the M clocks to couple the 16 data bits stored in the buffers 183-186 to the I/O scanner circuit 9. An AND gate 235 has one input connected to the second output 216 on the ring counter 213 and a second input connected to receive the M1 clock. Its output connects through an OR gate 236 to a data transmit strobe line 211 and to a reset terminal 237 on an R/S flip-flop 238. A second AND gate 239 has one input connected to the third output 217 on the ring counter 213 and a second input connected to receive the M1 clock. Its output also connects through the OR gate 236 to the line 211 as well as to a set terminal 240 on the flip-flop 238. During the second cycle through the M clocks, the line 201 is at a logic high voltage to couple the first eight-bit byte of data through the data selectors 195-198 and to initiate transmission of the first byte by driving the data transmit strobe line 211 to a logic high voltage. During the subsequent third cycle through the M clocks, the line 201 is at a logic low voltage and the second eight-bit byte of data is coupled to the UAR/T 167 for transmission to the I/O scanner circuit 9. After completion of the third cycle through the M clocks, the ring counter 213 is advanced to generate a logic high voltage at its first output 215 and the slot counter 214 is incremented to commence servicing the next I/O slot.

When the enabled I/O slot is comprised of operating devices, data is received at the UAR/T 167 and coupled through the output data gates 176 to the I/O data bus 180. An AND gate 241 in the adapter sequence control 200 has one input connected to the strobe echo line 232 and a second input connected to receive the M13 clock. Its output connects to a SET terminal 242 on an R/S flip-flop 243 and when an I/O slot comprised of operating devices is enabled, therefore, the flip-flop 243 is set to generate a logic high voltage at its Q output terminal 244. An AND gate 245 connects to the Q output 244 and it also has inputs connected to the third output 217 on the ring counter 213 and to the M11 clock terminal on the polyphase clock 206. Its output connects through a line 264 to a fault processor 251 which controls the enable terminal 181 on the output data gates 176 in a manner to be described hereinafter. The output of AND gate 245 also connects to one input on an AND gate 246. A second input on the AND gate 246 connects to receive the P3 clock and its output connects to a reset terminal 247 on the flip-flop 243. During the third cycle through the M clocks a logic high voltage is generated by the AND gate 245 to the enable terminal 181 to couple a sixteen-bit data word to the I/O data bus 180 during the M11 clock. The same logic high voltage resets the flip-flop 243 during the P3 time period.

The 16-bit data word is properly applied to the output data gates 176 by a pair of AND gates 248 and 249 and an OR gate 250. One input on the AND gate 248 connects to the second output 216 on the ring counter 213, its second input receives the M11 clock, and its output connects to the clock terminal 182 on the storage register 174. One input on the AND gate 249 also receives the M11 clock and its second input connects to the third output 217 on the ring counter 213. The outputs of both AND gates 248 and 249 connect to inputs on the OR gate 250, and the output of OR gate 250 connects to the UAR/T 167 through a data receive strobe line 210, and to a line 265 which connects to the fault processor 251. During the second cycle through the M clocks, the first 8-bit byte of received data is strobed from the UAR/T 167 and clocked into the storage register 174. During the third cycle through the M clocks, the second 8-bit byte of data is strobed from the UAR/T 167 and it along with the first eight-bit byte of data is coupled to the I/O data bus 180 through the output data gates 176.

Referring particularly to FIGS. 5 and 7, the operation of each interface rack 12–15 is monitored by a fault processor 251 which forms a part of each rack adapter circuit 23–26. Each fault processor 251 includes an OR gate 252 which has a set of three inputs that connect through leads 253–255 to the UAR/T 167. As indicated above, the UAR/T 167 is a commercially available circuit which detects transmission errors associated with the reception of data and which indicates such an error as a logic high voltage on one of the leads 253–255. More specifically, a parity error is indicated on lead 253, a framing error is indicated on lead 254 and a overrun error is indicated on lead 255.

The output of the OR gate 252 indicates whether or not a transmission error has occurred during the reception of each byte of data received by the UAR/T 167. The output connects to a data input terminal 256 on a random access memory 257; it connects to the input of an AND gate 258; and it connects to the set terminal 259 on an R-S flip-flop 260. The random access memory 257 is a commercially available circuit having 16 separately addressable 1-bit memory locations, one associated with each of the 2 bytes of data that are coupled to the eight I/O slots in the interface rack. Each memory location is addressed by a 4-bit binary number applied to address terminals 261 and data applied to data input 256 is stored, or written into an addressed memory location when a logic high voltage is applied to a read/write terminal 262. Three of the address terminals 261 connect to the slot counter outputs 220–222 in the adapter sequence control 200 through a three-conductor bus 263 and the least significant digit address terminal 261 connects to the third output of the ring counter 213 through a lead 160. The read/write terminal 262 connects to the adapter sequence control through the lead 265 and when it is at a logic low voltage, the logic state of the addressed storage location in the memory 257 is read out through a data out terminal 266 to a second input on the AND gate 258. The random access memory 257 stores a transmission error detected while receiving one of the sixteen bytes of data as a logic high, or "1", in the memory location associated with that data byte. If a successful reception of the same data byte is made during the next cycle, a logic low, or "0", is written into the same memory location.

The flip-flop 260 is a commercially available integrated circuit which includes a reset terminal 267 that connects to the output of an AND gate 274, which in turn receives the M14 clock through a lead 268 and which connects to the third ring counter output 217 through the lead 160. A Q output 269 on the flip-flop 260 connects to one input on an AND gate 270 and the lead 264 from the adapter sequence control 200 connects to a second input. The output of the AND gate 270 connects through a lead 273 to control the operation of the output data gates 176.

When a transmission error is detected and indicated at the output of OR gate 252, the event is not only stored in the random access memory 257, but it is also stored in the R—S flip-flop 260. A logic low voltage is thus generated at the Q output 269 which disables the AND gate 270 and the output data gates 176 to thus prevent application of the received data to the I/o data bus 180. The R—S flip-flop is subsequently reset by the AND gate 274 in preparation for the reception of the next byte of data by the UAR/T 167.

The AND gate 258 provides an indication that two successive transmission errors have occurred and that a major fault is probably indicated. Its output connects through an OR gate 275 to one input 279 of a 5-bit status word storage 276. The storage 276 is a set of 5 D-type flip-flops having their clock terminals commonly connected to a lead 277 and their reset terminals commonly connected to receive the M14 clock through the lead 268. A second input 280 on the storage 276 connects to a fault indicate bus 281 which in turn connects to each slot in the interface rack to indicate the status of the fuses in an addressed slot. If a fuse is blown, a logic high voltage is generated on the bus 281 and is clocked into the storage 276. Three additional inputs 282 on the storage 276 connect to the slot counter bus 263 and when a fault is indicated on the bus 281 and is clocked into the storage 276, the corresponding slot number on the bus 263 is stored as well. The storage 276 is clocked by a monostable multivibrator circuit 283 which has its input coupled to the output of OR gate 275 and to the fault indicate bus 281 through an OR gate 284.

The output of the OR gate 275 indicates the occurrence of a major malfunction. If two successive transmission errors are detected by the UAR/T 167 with respect to any one byte of received data, both inputs of the AND gate 258 are at a logic high voltage and a major fault indication is coupled through the OR gate 275 and stored in the storage 276. In addition, a second type of major fault is indicated by an AND gate 285 which connects to a second input on the OR gate 275. One input of the AND gate 285 connects to the slot counter in the adapter sequence control 200 through a command status bus 286 and a second input connects to the output of a NAND gate 287. Each of six inputs on the NAND gate 287 connect to a conductor in the I/O data bus 180, and if one of the conductors should short circuit to ground, a logic high voltage is generated by the NAND gate 287 and is coupled to the status word storage 276 during the status check time period.

Referring particularly to FIG. 5, the status word storage 276 in the fault processor 251 indicates whether either a major fault or a minor fault has occurred during a complete scan through the I/O slots. The status word also indicates the slot number at which an indicated minor fault has occurred. This information is coupled through a set of five leads 288–292 to C inputs on the data selectors 195–198. The command status bus 286 connects to a data select terminal 293 on each selector 195–198, and during the status check time period, the five-bit status word is applied through the data bus 202 to the UAR/T 167 for transmission to the I/O scanner 9. As will now be described, the status word is received by the appropriate UAR/T's 35–38 at the scanner 9 and is coupled to a fault processor 300 disposed therein. Status information is thus periodically transmitted from each of the remotely located I/O interface racks 12–15 to the centrally located I/O scanner 9 to provide a continuous check on the system operation.

Figure 4A:
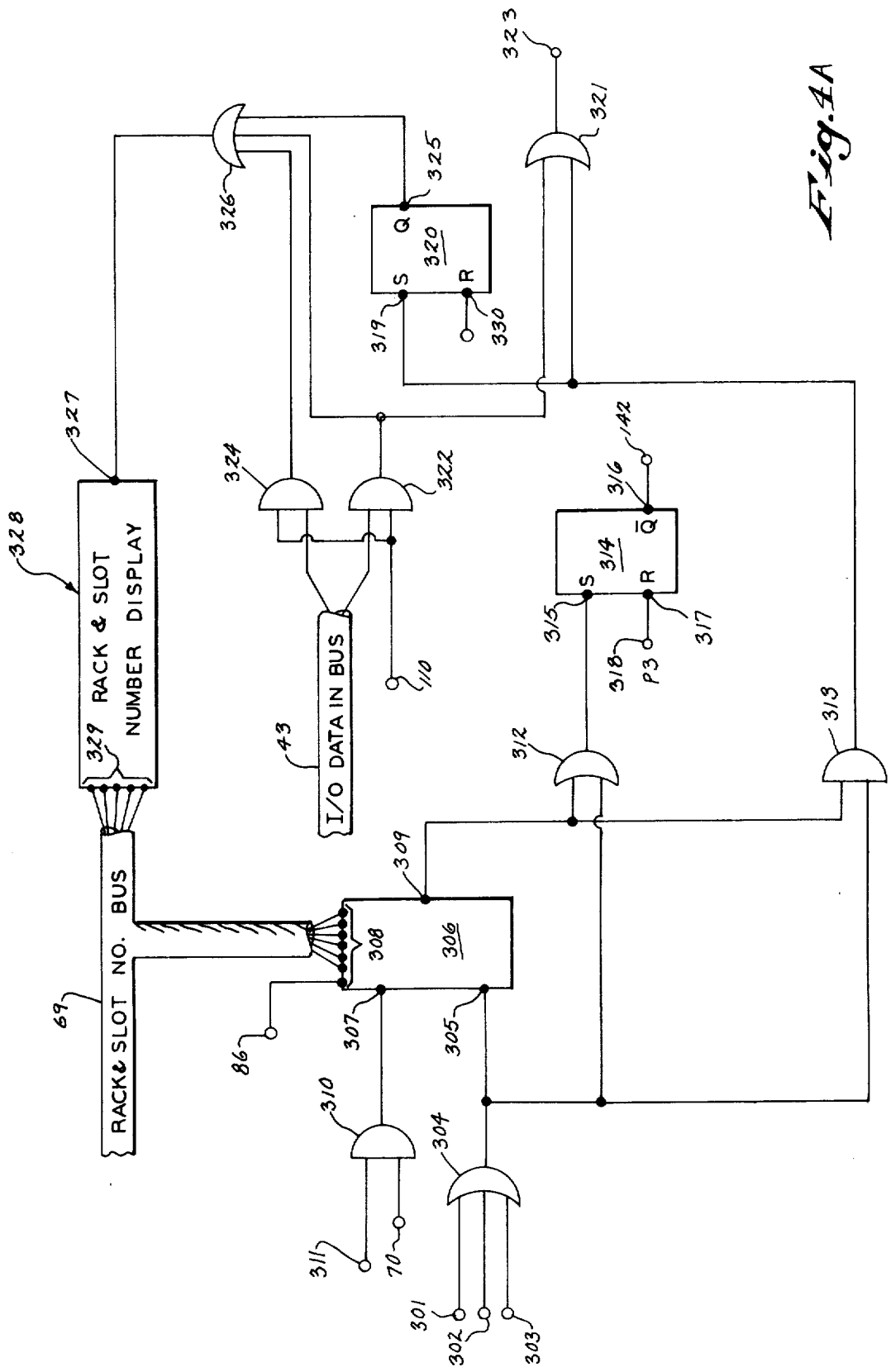
Figure 4B:
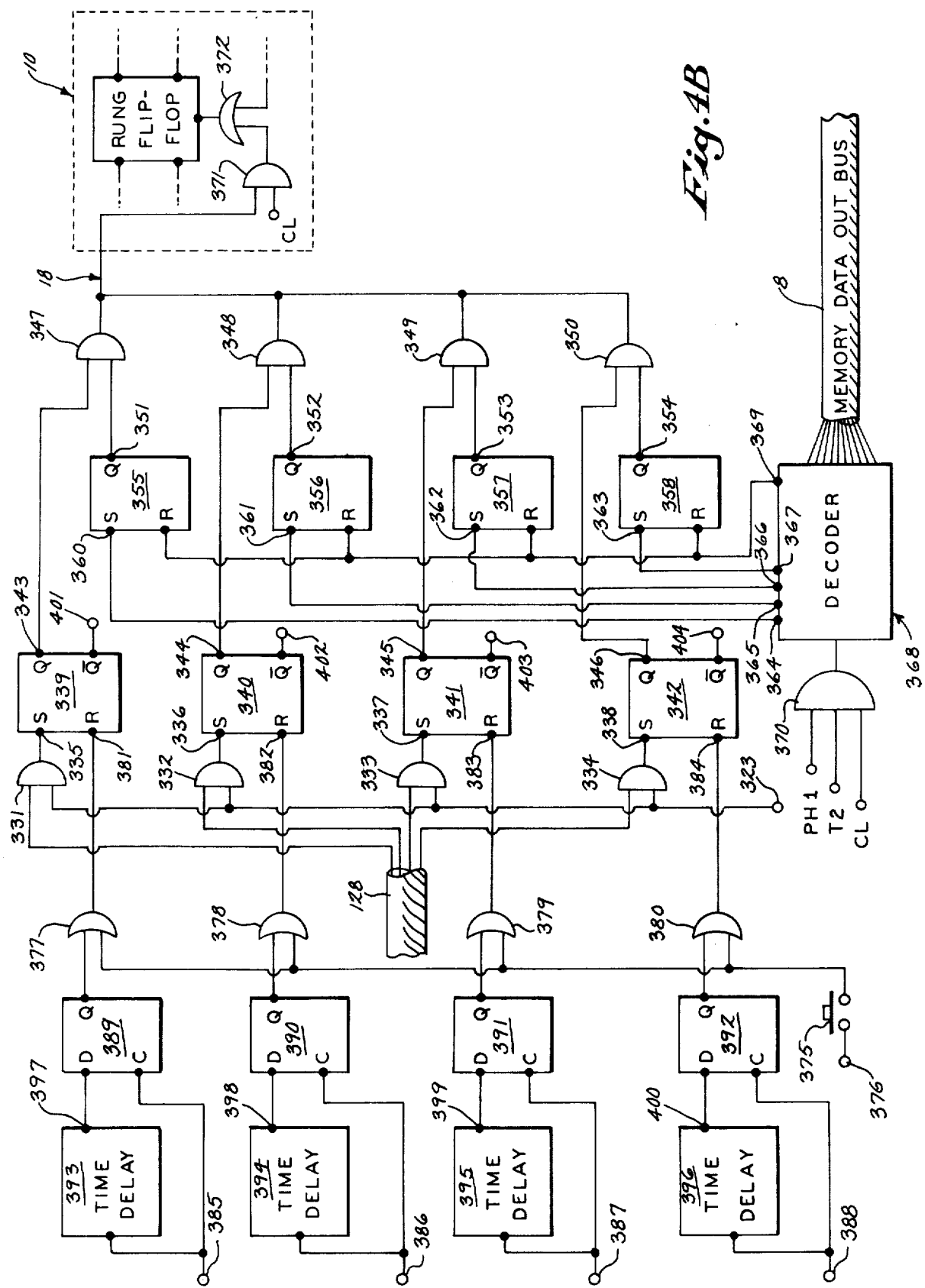

Referring particularly to FIGS. 2, 4a and 4b, the fault processor 300 is located at the I/O scanner circuit 9 and is operable to monitor the operation of the I/O scanner circuit 9 and to receive and process the status words generated by the fault processors 251 at each of the interface racks 12–15. More specifically, the fault processor 300 connects to the I/O data in bus 43, the rack and slot number bus 69, the memory data bus 8, and to the scanner sequence control 65. In addition, the fault processor 300 connects through a set of three leads 301–303 to each of the UAR/T's 35–38 to receive transmission error information, such as parity errors, framing errors, and overrun errors as described above.

The leads 301–303 connect to an OR gate 304 in a fault tolerant detection circuit similar to that contained in the interface rack fault processors 251. The output of OR gate 304 connects to a data input terminal 305 on a random access memory 306 and its logic state is stored in an addressed memory location therein when a logic high voltage is applied to a read/write terminal 307. The random access memory 306 is a commercially available integrated circuit which includes 64, separately addressable 1-bit storage locations. The storage locations are separately addressed at a set of terminals 308 and data is read out of an addressed storage location through an output terminal 309 when the read/-write terminal 307 is low. The byte select line 86 from the scanner sequence control 65 connects to the least significant address terminal 308 and the five leads in the rack and slot number bus 69 connect to the remaining terminals 308. The read/write terminal 307 is driven by an AND gate 310 which has one input connected to receive the P1 clock from the scanner sequence control 65 through a lead 311, and a second input connected to receive the M1, M3, M5 and M7 clocks through the line 70. As each byte of input data is applied to the I/O data in bus 43 by the UAR/T's 35–38, transmission errors which may have occurred will be detected and the event stored at an associated memory location in the random access memory 306.

Each detected transmission error is also applied to a flip-flop 314 to inhibit a processor interrupt which would otherwise write the erroneous data into the input image table 3 of the memory 1. More specifically, the input 305 on the random access memory 306 connects to one input on an OR gate 312 and to one input on an AND gate 313. Memory output terminal 309 connects to a second input on each of the gates 312 and 313 and the output of the OR gate 312 connects to a set input 315 on the flip-flop 314. A Q output 316 on the flip-flop 314 connects through the interrupt disable line 142 to the scanner sequence control 65 as described above and shown in FIG. 3. A reset terminal 317 on the flip-flop 314 connects to receive the P3 clock through a lead 318.

During the reception of the first 8-bit byte of data from any I/O slot, a logic high or a logic low is stored in the random access memory 306 depending on whether a transmission error has occurred. As will be recalled from the description above, the first byte of data from each I/O slot is stored in the temporary storage 66 until the second byte is received later in the sequence. When the second byte of data is subsequently received, both the first byte of data stored in the temporary storage 66 and the second byte of data on the I/O data in bus 43 are in position for application to the memory data bus 8.

If a transmission error was detected during the reception of either data byte, an interrupt is not requested and the memory data in gates 71 remain disabled. If a transmission error was associated with the reception of the first data byte, a logic high voltage appears at the output 309 of the random access memory 306 and this is applied through OR gate 312 to set the flip-flop 314. If a transmission error was associated with the reception of the second data byte, a logic high voltage appears at the output of OR gate 304 and is similarly applied through OR gate 312 to set the flip-flop 314. Referring particularly to FIG. 3, the logic low voltage thus generated by the flip-flop 314 on the interrupt disable line 142 prevents the generation of an interrupt request to the processor 10 by the circuit 137. Because no interrupt can thus be granted, the interrupt granted line 111 remains low and the memory data in gates 71 remain disabled. The erroneous data is thus not written into the input image table 3 and the scanner circuit 9 continues on to the next step in its sequence.

Although the data associated with a transmission error is thus "ignored", the fault tolerant detector circuit does not indicate a major fault, or initiate the shutdown process unless two successive transmission errors occur with respect to any one data byte. The first transmission error is stored in the random access memory 306 and appears as a logic high voltage at the output 309 when the same data byte is again received. If a transmission error also occurs on this subsequent transmission, a logic high voltage is generated by the OR gate 304 and a logic high voltage is generated by the memory 306 to the AND gate 313 during the P0 time period. A major fault is thus detected and indicated at the output of AND gate 313.

The output of the AND gate 313 connects to a set input 319 on an R—S flip-flop 320 and to one input of a major fault OR gate 321. A second input on the OR gate 321 connects to the output of a major fault AND gate 322 and its output connects to a programmable disabling circuit through an error line 323. One input on the AND gate 322 connects to the status line 110 which leads from the scanner sequence control 65, and a second input thereon connects to a conductor in the I/O data bus 43 to receive a logic high voltage when a major fault is indicated in a status word received from one of the interface racks 12–15. A minor fault AND gate 324 also has an input connected to the status line 110 and a second input connected to a conductor in the I/O data in bus 43 to receive a logic high voltage when a minor fault is indicated in a received status word. The AND gate 324 generates a logic high voltage at its output when a minor fault is indicated in a received status word.

The outputs of AND gates 324 and 322 and a Q output terminal 325 on the flip-flop 320 each connect to inputs on an OR gate 326. The output of OR gate 326 connects to an enable terminal 327 on a rack and slot number display 328, which also includes a set of five inputs 329 that connect to the leads in the rack and slot number bus 69. The display 328 is a commercially available device which includes two BCD-to-seven-segment decoder/drivers that connect to a pair of light emitting diode indicators. Two of the leads in the bus 69 connect to drive one indicator to display the rack number and the remaining three leads drive the other indicator to display the slot number.

If a minor fault (blown fuse in an I/O slot) should be detected in a received status word, the operation of the controller is not altered, but the slot and rack number of the malfunction is displayed. On the other hand, if a major transmission fault is indicated by the AND gate 313, not only is the flip-flop 320 set to enable the rack and slot number display 328, but a logic high voltage is generated on the error line 323 to initiate a shutdown process to be described hereinafter. If a major fault is detected in a received status word by the AND gate 322 the display 328 and the shutdown process are similarly enabled. After the difficulty is corrected the circuit is manually reset by applying a logic high voltage to a reset terinal 330 on the flip-flop 320.

Referring particularly to FIGS. 2 and 4b, the shutdown process which occurs when the error line 323 is driven high is controlled by a programmable disabling circuit shown in FIG. 4b. The error line 323 connects to an input on each of four AND gates 331–334 and a second input on each AND gate 331–334 connects to one of the four conductors in the rack number bus 128. The outputs of the respective AND gates 331–334 connect to set terminals 335–338 on respective R—S flip-flops 339–342 and Q outputs 343–346 on these flip-flops connect to inputs on respective output AND gates 347–350. A second input on each output AND gate 347–350 connects to a Q output 351–354 on respective R—S flip-flops 355–358 and an output on each AND gate 347–350 connects to the rack disable line 18. Set terminals 360–363 on the flip-flops 355–358 connect to output terminals 364–367 on a decoder circuit 368 and their reset terminals are commonly connected to a decoder output terminal 369. The decoder circuit connects to the memory data bus 8 and is enabled by an AND gate 370 which connects to receive PH1, T2 and C1 timing clocks from the processor 10.

When a major fault occurs, the error line 323 goes high and the lead in the rack number bus 128 associated with the faulty rack is also at a logic high voltage. As a result, the flip-flop 339–342 associated with the faulty rack is set and a logic high voltage is applied to its associated output AND gate 347–350. For example, if a major fault is detected while rack number 2 is being serviced, the flip-flop 340 is set and a logic high voltage is applied to one input on its associated AND gate 348. The AND gate 348 is, therefore, in condition to drive the rack disable line 18 to a logic high voltage when the flip-flop 356 is set. The operation of the flip-flops 355–358 is controlled by the decoder 368 which in turn is responsive to selected program instructions stored in the controller memory 1.

The decoder 368 generates a logic high voltage at one of its respective output terminals 364–367 when the following controller program instructions are read out of the memory 1 and appear on the data bus 8 during the PH1·T2·C1 time period.

| Mnemonic | Bit Pattern | | | | | Result |
|---|---|---|---|---|---|---|
| STF 1 | 1110 | 011 | 111 | 111 | 001 | Output 364 goes high |
| STF 2 | 1110 | 011 | 111 | 111 | 010 | Output 365 goes high |
| STF 3 | 1110 | 011 | 111 | 111 | 011 | Output 366 goes high |
| STF 4 | 1110 | 011 | 111 | 111 | 100 | Output 367 goes high |

A logic high reset voltage is generated at the decoder output terminal 369 when the following program instruction appears on the memory data bus 8 during the PH1·T2·C1 time period.

| Mnemonic | Bit Pattern | | | | | Result |
|---|---|---|---|---|---|---|
| ENF | 1111 | 011 | 111 | 111 | 000 | Output 369 goes high |

These program instructions are stored in the controller memory 1 and are executed during each scan through the control program 4. The STF 1–4 instructions are typically placed at the beginning of those controller program instructions which relate to the respective interface racks 12–15 and the ENF instruction appears at the end of each such set of instructions. In other words, the STF 1–4 and ENF instructions "fence off" the program instructions into sets of instructions which are each related to one of the interface racks 12–15. If a fault has occurred in interface rack No. 2, for example, the flip-flop 340 is set as described above and the output AND gate 348 is enabled. When the STF 2 instruction is executed, therefore, the flip-flop 356 is set and the disable line 18 is driven high. The processor 10 continues to execute the fenced off program instructions, but as will be described below, operating devices which are addressed by these instructions will be automatically decontrolled or deenergized. When the ENF instruction is executed, the flip-flop 356 is reset and the remainder of the control program is executed in normal fashion. An example of a control program 4 which is thus fenced off to provide independent I/O interface rack operation is as follows:

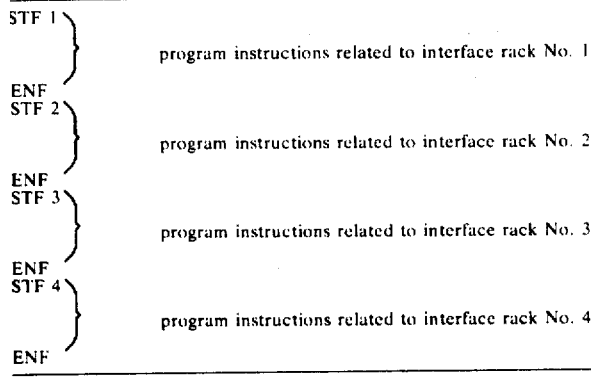

As described in the above cited U.S. Pat. No. 3,942,158, a "rung flip-flop" is contained in the logic unit of the processor 10 which stores the result of the various tests, or examinations, made by the program instructions to determine whether or not operating devices on the controlled system should be energized. When the rung flip-flop is in the set state, addressed operating devices are to be energized and when it is in the reset stage, they are to be deenergized by the controller. Thus rung flip-flop is shown in FIG. 4b for the purpose of illustrating the manner in which the programmable disabling circuit operates the processor 10. More specifically, the rack disable line 18 is connected to a reset terminal on the rung flip-flop through an AND gate 371 and an OR gate 372. When the rack disable line 18 is at a logic high voltage, the rung flip-flop is continuously reset by the C1 closk applied to a second input on the AND gate 371. As a result, a "false" decision is imposed thereon which causes the output image table status bits of all operating devices identified by executed program instructions to indicate a deenergized state.

Referring particularly to FIGS. 2 and 4b, the faulty interface rack is decontrolled by inhibiting the transmission of data by its associated UAR/T 35-38. Q terminals 401—404 on the flip-flops 339—342 connect to second input terminals on the respective AND gates 31-34 connect to second input terminals on the respective AND gates 31-34 which couple the UAR/T output terminals 52-55 to the line drivers 56-59. When a major fault is detected, one of the flip-flops 339-342 is set and its Q output is driven to a logic low voltage. The faulty interface rack is thus decoupled from its associated UAR/T 35-38 by a disabled AND gate 31-34. Although the operating devices controlled by the decoupled interface rack are thus left in the state which existed when the fault was detected, it should be apparent that a "watch dog timer" may also be provided at each interface rack 12-15 which times out when data is not received from the I/O scanner 9 and which deenergizes the interface rack and all operating devices which it controls.

Although the shutdown process can be limited to the interface rack which is directly associated with the detected fault, operating devices on machines controlled by other interface racks can be deenergized as well. Such guasi-independent operation is achieved by including program instructions directed to operating devices on one interface rack within the fenced off program instruction set of another interface rack. This is particularly useful where the shutting down of one controlled machine may have an effect on the operation of other controlled machines. For example, a transfer line controlled by one interface rack may be made aware that a drilling station controlled by another interface rack is shut down and that parts should not be conveyed to it.

Referring particularly to FIG. 4b, when a malfunction has been remedied, the programmable disabling circuit may be reset either locally at the scanner circuit 9 or remotely from the affected interface rack. A reset pushbutton 375 is provided and connects to a logic high voltage source terminal 376 and to one input on each of four OR gates 377–380. The outputs on the respective OR gates 377–380 connect to reset terminals 381–384 on the respective flip-flops 339–342 and when the pushbutton 375 is depressed, all of the flip-flops 339–342 are reset.

Referring particularly to FIGS. 2 and 4b, the programmable disabling circuit also connects to receive reset pulses from the interface racks 12-15. The respective input circuits 48-51 to the I/O scanner 9 connect through a set of four leads 385-388 to clock terminals on respective D-type flip-flops 389–392 and to input terminals on respective time delay circuits 393–396. The time delay circuits 393–396 are commercially available monostable multivibrators which generate a logic high voltage pulse at respective outputs 397–400 a preset time interval after a logic high voltage is applied to their respective inputs. The outputs 397–400 connect to the respective D inputs on the flip-flops 389–392 and Q outputs on the flip-flops 389–392 connect to second inputs on the respective OR gates 377–380. When a reset pulse of selected duration is received at one of the input circuits 48–51, its associated flip-flop 389–392 is set and a logic high voltage is applied to its associated flip-flop 339-342 to reset the programmable disabling circuit. The programmable disabling circuit can thus be reset either locally by depressing the pushbutton 375, or it can be reset by depressing a corresponding button located at each of the interface racks 12-15.

We claim:

1. In an industrial digital control system having a centrally located processor means, a remotely located interface rack which connects to a controlled machine to operate devices thereon in response to received digital data bytes and to generate digital data bytes which correspond to the status of sensing devices on the controlled machine, and means for cyclically coupling a series of digital data bytes between the processor means and interface rack, the improvement therein of a fault processor which comprises:

means for detecting the occurrence of a transmission error associated with the coupling of a byte of digital data between said remote interface rack and said processor means;

storage means connected to said detecting means for storing a selected logic state when a transmission error is detected with respect to the coupling of a byte of data;

data gate means connected between said interface rack and said processor means and connected to said detecting means, said data gate means being responsive to a detected transmission error to decouple the byte of digital data associated with the detected transmission error such that it has no effect on the operation of the industrial digital control system;

means for decontrolling the controlled machine when a fault is indicated; and gate means having one input connected to said detecting means, a second input connected to said storage means and an output connected to said decontrolling means, said gate means being operable to indicate a fault to said decontrolling means when a plurality of successive transmission errors are detected with respect to one of said bytes in said series of digital data bytes.

2. The improvement as recited in claim 1 in which said storage means includes a memory location associated with each of said data bytes in the series.

3. The improvement as recited in claim 1 in which said fault processor is located with the centrally located processor means and said detecting means detects transmission errors associated with the coupling of bytes of data from said remotely located interface rack to said processor means.

4. The improvement as recited in claim 3 in which a second fault processor is located with the remotely located interface rack and the detecting means therein detects transmission errors associated with the coupling of bytes of data from said processor means to said interface rack.

5. The improvement as recited in claim 4 in which the decontrolling means in said fault processor which is located with the interface rack includes means for periodically coupling a status word to said fault processor located at the processor means, which status word indicates whether or not a fault has occurred, and the detecting means of the fault processor which is located at the processor means is connected to receive a fault indication contained in the status word, and in response thereto, to decontrol the controlled machine connected to the remotely located interface rack.

6. In a programmable controller having a processor which executes control program instructions stored in a controller memory to operator devices on controlled machines which connect to said processor through a plurality of controller interface racks, the improvement therein of a fault processor which comprises:

means for detecting faults associated with said interface racks;

a plurality of storage means, each storage means being associated with one of said interface racks and each being connected to said detecting means for storing a detected fault associated with its interface rack;

a disable line connected to said controller processor to force the deenergization of operating devices addressed by executed program instructions when the line is in a selected logic state;

a set of logic gate means, each logic gate means being associated with one of said interface racks and each having an input connected to one of said interface racks and each having an input connected to one of said storage means and an output connected to said disable line; and a decoder connected to said controller memory to receive control program instructions stored therein and having a set of outputs each coupled to one of said logic gates means, said decoder being responsive to special program instructions read from said controller memory to selectively enable said logic gate means to generate said selected logic state on said disable line when a detected fault is stored in their associated storage means.

7. The fault processor as recited in claim 6 in which each of said logic gate means includes a flip-flop which is set in one of its two logic states in response to one of said enabling special instruction and said flip-flop is connected to said decoder and is reset to its other logic state in response to another one of said special instructions, wherein said selected logic state is generated on said disable line by an enabled logic gate means until its associated flip-flop is reset.

8. The fault processor is recited in claim 6 in which said programmable controller processor includes means for deciding whether addressed devices on the controlled machines are to be energized, and said disable line connects to said deciding means to force decisions which cause addressed devices to be deenergized when the disable line is in said selected logic state.

9. The fault processor as recited in claim 6 in which the programmable controller includes means for cyclically receiving a series of data bytes from said interface racks and indicating the occurrence of a transmission error associated with each received data byte, and gate means for coupling received data bytes to said controller memory; said means for detecting faults including:

transmission error storage means having a memory location associated with each data byte in said series;

means connected to said receiving means and to said transmission error storage means for storing at the memory location in said transmission error storage means which is associated with the data byte received, an indication that a transmission error occurred; and means connected to said receiving means and said coupling gate means for disabling said coupling gate means to prevent coupling of a data byte associated with a transmission error to said controller memory.

10. The fault processor as recited in claim 9 in which said means for detecting faults includes:

major fault logic gate means having one input connected to said transmission error storage means, a second input connected to said receiving means and an output connected to said fault storage means, said major fault logic gate means being responsive to indicate a detected fault to said fault storage means when said receiving means indicates the occurrence of a transmission error during the reception of a data byte and said transmission error storage means indicates that a transmission error occurred during the previous cycle with respect to the same data byte.

11. A programmable controller which comprises:

a controller memory which stores an input image table, an output image table and a control program;

a controller processor for executing the control program to control the state of output status bits stored in said output image table in response to the state of input status bits stored in said input image table;

an I/O scanner connected to said controller memory and including means for periodically interrupting the operation of said controller processor, means for coupling a byte of input status bits to said input image table during an interrupt, and means for coupling a byte of output status bits from said output image table during an interrupt;

an interface rack remotely located from said I/O scanner and connected to a controlled machine to operate devices thereon in response to the state of received output status bits and to monitor the state of sensing devices thereon and generate corresponding input status bits;

cable means linking said I/O scanner and said interface rack;

first transmitter means located at said I/O scanner and connected thereto to receive bytes of output status bits, said first transmitter means having an output which connects to the cable means for serially transmitting thereon each received byte of output status bits;

first remote receiver means located at said interface rack and connected to said cable means to receive said output status bits serially transmitted by said first transmitter means;

first remote transmitter means located at said interface rack and connected thereto to receive input status bits, said first remote transmitter means having an output which connects to the cable means for serially transmitting thereon each received input status bit; and first receiver means located at said I/O scanner and connected to said cable means to receive said input status bits serially transmitted by said first remote transmitter means, said first receiver means being operable to convert said serially received input status bits to bytes of input status bits for coupling to said controller memory by said I/O scanner.

12. The programmable controller as recited in claim 11 in which there are additional remotely located interface racks, each linked to said I/O scanner by separate, associated cable means, and each includes an associated transmitter means and an associated receiver means located at said I/O scanner; said I/O scanner further including means for sequentially coupling bytes of output status bits associated with respective interface racks from the output image table of said controller memory and means for sequentially enabling said respective transmitter means at said I/O scanner to transmit the bytes of output status bits associated with their associated interface racks.

13. The programmable controller as recited in claim 12 in which said I/O scanner includes means for sequentially coupling the butes of input status bits received by said respective receiver means at said I/O scanner to locations in the input image table of said controller memory which are associated with their respective associated interface racks.

* * * * *

UNITED STATES PATENT AND TRADEMARK OFFICE
CERTIFICATE OF CORRECTION

PATENT NO. : 3,997,879  First Page of Three
DATED : December 14, 1976
INVENTOR(S) : Odo J. Struger et al It is certified that error appears in the above-identified patent and that said Letters Patent are hereby corrected as shown below:

Column 5, line 51     "16 bits of the" should be -- 16 bits of --

Column 8, line 18     "whih" should be -- which --

Column 8, line 67     "Q" should be -- $\overline{Q}$ --

Column 10, line 41     "53" should be -- 153 --

Column 10, line 57     "8bit" should be -- 8-bit --

Column 13, in table after "M10-M13    No action."
             add -- M14      Advance byte counter 95 and slot counter 101 through ring counter 130. --

Column 13, line 23     "applied" should be -- applies --

Column 13, line 29     "drive" should be -- driver --

Column 18, line 6     "Q" should be -- $\overline{Q}$ --

Column 18, line 16     "Q" should be -- $\overline{Q}$ --

Column 18, line 18     "I/o" should be -- I/O --

Column 19, line 63     "Q" should be -- $\overline{Q}$ --

Column 21, line 47     "outputs of" should be -- outputs on --

Column 23, line 26     "stage" should be -- state --

Column 23, line 27     "Thus" should be -- This --

UNITED STATES PATENT AND TRADEMARK OFFICE
CERTIFICATE OF CORRECTION

PATENT NO. : 3,997,879                          Second Page of Three
DATED          : December 14, 1976
INVENTOR(S) : Odo J. Struger et al It is certified that error appears in the above-identified patent and that said Letters Patent are hereby corrected as shown below:

Column 23, line 34    "closk" should be -- clock --

Column 23, line 42    "Q" should be -- $\overline{Q}$ --

Column 23, line 45    delete "connect to second input terminals on the respec-"

Column 23, line 46    delete "tive AND gates 31-34"

Column 23, line 49    "Q" should be -- $\overline{Q}$ --

Column 23, lines 50-51    "assoicated" should be -- associated --

Column 23, line 64    "guasi-independent" should be -- quasi-independent --

Column 25, line 54    "operator" should be -- operate --

Column 26, line 4    delete "interface racks and each having an input connected"
Claim 6

Column 26, line 5    delete "to one of said"
Claim 6

Column 26, line 19    "said enabling" should be -- said selected enabling --
Claim 7

Column 26, line 26    "is" should be -- as --
Claim 8

Column 26, lines 46-47    "byte received" should be -- byte being received --
Claim 9

UNITED STATES PATENT AND TRADEMARK OFFICE
CERTIFICATE OF CORRECTION

PATENT NO. : 3,997,879  Third Page of Three
DATED : December 14, 1976
INVENTOR(S) : Odo J. Struger et al It is certified that error appears in the above-identified patent and that said Letters Patent are hereby corrected as shown below:

Column 28, line 28  "butes" should be -- bytes --
   Claim 13

Signed and Sealed this

Twenty-second Day of August 1978

[SEAL]

Attest:

RUTH C. MASON
Attesting Officer

DONALD W. BANNER
Commissioner of Patents and Trademarks